United States Patent
Bauch et al.

(10) Patent No.: US 11,732,067 B2
(45) Date of Patent: *Aug. 22, 2023

(54) HIGH STIFFNESS POLYPROPYLENE IMPACT COPOLYMER

(71) Applicant: ExxonMobil Chemical Patents Inc., Baytown, TX (US)

(72) Inventors: Christopher G. Bauch, Seabrook, TX (US); Todd S. Edwards, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 263 days.

This patent is subject to a terminal disclaimer.

(21) Appl. No.: 16/624,614

(22) PCT Filed: Apr. 11, 2018

(86) PCT No.: PCT/US2018/027088
§ 371 (c)(1),
(2) Date: Dec. 19, 2019

(87) PCT Pub. No.: WO2019/005261
PCT Pub. Date: Jan. 3, 2019

(65) Prior Publication Data
US 2020/0140584 A1 May 7, 2020

Related U.S. Application Data

(60) Provisional application No. 62/525,347, filed on Jun. 27, 2017.

(51) Int. Cl.
| | | |
|---|---|---|
| C08F 110/06 | (2006.01) | |
| C08F 4/02 | (2006.01) | |
| C08F 10/06 | (2006.01) | |

(52) U.S. Cl.
CPC ............ C08F 110/06 (2013.01); C08F 4/022 (2013.01); C08F 10/06 (2013.01)

(58) Field of Classification Search
None
See application file for complete search history.

(56) References Cited

U.S. PATENT DOCUMENTS

| | | | |
|---|---|---|---|
| 5,422,400 A | 6/1995 | Kamiyama et al. | |
| 6,054,542 A | 4/2000 | Kojoh et al. | |
| 6,147,152 A | 11/2000 | Kanome et al. | |
| 6,403,708 B2 | 6/2002 | Moriya et al. | |
| 6,759,475 B2 | 7/2004 | Sakai et al. | |
| 6,818,583 B1 | 11/2004 | Morini et al. | |
| 7,081,493 B2 | 7/2006 | Kawai et al. | |
| 7,208,435 B2 | 4/2007 | Hosaka et al. | |
| 7,217,768 B2 | 5/2007 | Salek et al. | |
| 7,445,827 B2 | 11/2008 | Le et al. | |
| 7,514,509 B2 * | 4/2009 | Marin | B01J 31/2295 526/170 |
| 8,445,598 B2 | 5/2013 | Nenseth et al. | |
| 8,618,220 B2 | 12/2013 | Reijnjens et al. | |
| 8,653,198 B2 | 2/2014 | Leland | |
| 9,206,265 B2 | 12/2015 | Uozumi et al. | |
| 9,416,238 B2 | 8/2016 | Leland | |
| 9,550,844 B2 | 1/2017 | Gahleitner et al. | |
| 9,587,044 B2 | 3/2017 | Hafner et al. | |
| 2002/0058741 A1* | 5/2002 | Sakai | C08L 53/025 524/505 |
| 2005/0187349 A1* | 8/2005 | Kim | C08L 23/10 525/191 |
| 2007/0010625 A1* | 1/2007 | News | C08L 23/10 525/240 |
| 2010/0152382 A1* | 6/2010 | Jiang | C08F 10/06 525/53 |
| 2014/0107274 A1 | 4/2014 | Salek et al. | |
| 2015/0166693 A1 | 6/2015 | Hosaka et al. | |
| 2015/0240011 A1 | 8/2015 | Hosaka et al. | |
| 2016/0115258 A1* | 4/2016 | Hafner | C08L 23/12 526/65 |
| 2016/0137761 A1 | 5/2016 | Gahleitner et al. | |
| 2016/0326355 A1 | 11/2016 | Marques Ferreira Custodio et al. | |
| 2017/0267794 A1* | 9/2017 | Lin | C08F 210/06 |
| 2020/0131353 A1* | 4/2020 | Edwards | C08F 4/65916 |

FOREIGN PATENT DOCUMENTS

| | | |
|---|---|---|
| CN | 105623077 A | 6/2016 |
| EP | 0602508 B | 11/1998 |
| EP | 0942021 A | 9/1999 |
| EP | 2738214 B | 5/2015 |
| EP | 2876118 A | 5/2015 |
| EP | 3015504 A | 5/2016 |

OTHER PUBLICATIONS

Jiang, T., et al. "Copolymerization of Ethylene and Propylene Catalyzed by Magnesium Chloride Supported Vanadium/Titanium Bimetallic Ziegler-Natta Catalysts" Chinese Journal of Polymer Science, vol. 29, No. 4, pp. 475-482, 2011.

* cited by examiner

*Primary Examiner* — Satya B Sastri
(74) *Attorney, Agent, or Firm* — Vorys, Safer, Seymour and Pease LLP

(57) ABSTRACT

Disclosed is a polypropylene with an MFR of at least 20 g/10 min comprising a homopolypropylene and optionally within a range from 2 wt % to 30 wt % of an propylene-α-olefin copolymer by weight of the polypropylene; wherein the homopolypropylene has a MFR within a range from 30 g/10 min to 200 g/10 min, an Mw/Mn within a range from 7 to 16, and comprising 1.1 wt % or less atactic polypropylene based on the total weight of the homopolypropylene and atactic polypropylene, where the propylene-α-olefin copolymer has within a range from 30 wt % to 50 wt % α-olefin derived units by weight of the propylene-α-olefin copolymer, and an intrinsic viscosity within a range from 4 to 8 dL/g. The impact copolymer may be obtained by combining a Ziegler-Natta catalyst having at least two different internal electron donors with propylene in reactors in series to produce the homopolypropylene followed by a gas phase reactor to produce a propylene-α-olefin copolymer.

18 Claims, No Drawings

HIGH STIFFNESS POLYPROPYLENE IMPACT COPOLYMER

PRIORITY CLAIM

This application is a National Phase Application claiming priority to PCT Application Serial No. PCT/US2018/027088 filed Apr. 11, 2018, which claims priority to and the benefit of U.S. Provisional Application No. 62/525,347, filed Jun. 27, 2017, which are incorporated herein by reference.

FIELD OF THE INVENTION

The present disclosure relates to a blend of a homopolypropylene and propylene-α-olefin to form improved Propylene-based impact copolymers having a high melt flow rate (at least 20 g/10 min) and high stiffness.

BACKGROUND

Propylene-based impact copolymers ("ICP's"), sometimes called "block copolymers", are an intimate blend of a homopolypropylene and propylene-α-olefin (e.g., ethylene-propylene rubber "EPR"), and are useful in a number of commercial products such as automobile and appliance components. The homopolypropylene is said to form a continuous phase of the blend, while the propylene-α-olefin forms domains within the continuous phase, thus forming a heterogeneous blend. The catalysts often used to make ICP's comprise a solid catalyst components that includes magnesium, titanium, at least one internal electron donor, and at least one external electron donor as components, generally referred to as "Ziegler-Natta" catalysts. The properties of ICP's can be tailored at least in party by the identity of the solid catalyst and polymerization conditions. From its many components, there are a number of ways in which Ziegler-Natta catalysts can be varied to control the properties of the polymer produced therefrom.

For example, polypropylene stiffness (i.e., flexural modulus) is strongly correlated to its isotacticity. Generally, highly isotactic polypropylene shows high flexural modulus, and certain catalysts are known to effect this property. On the other hand, other catalysts produce polypropylenes containing some xylene-soluble fraction (atactic polypropylene) that is not ideal for automotive use due to insufficient flexural modulus. Thus there is a desire to improve in flexural modulus of ICP's, while maintaining or improving their other properties such as impact resistance and processability.

An object of the invention is to provide an improved ICP's and methods for producing such ICP's. Such improved ICP's would preferably show high flexural modulus and the presence of high a molecular weight fraction to improve injection molding processes. The inventors have found that these objects can be achieved by conducting olefin (co)polymerization using a catalyst that is obtained by combining a magnesium compound, titanium halide compound, and phthalate and alkylidene malonate compounds to form the active Ziegler-Natta catalyst, and alternatively (or additionally) by varying the hydrogen concentration in the polymerization reactor(s) used to produce at least the homopolypropylene portion of the ICP.

Related publications include U.S. Pat. Nos. 6,147,152; 6,403,708; 6,759,475; 6,818,583; 7,081,493; 7,208,435; 7,217,768; 7,445,827; 8,445,598; 8,618,220; 8,653,198; 9,206,265; 9,416,238; EP 0 942 021 A1; EP 2 738 214 B1; US 2014/0107274; US 2015/166693; US 2015/240011; and US 2016/0326355.

SUMMARY

Disclosed is a homopolypropylene having a melt flow rate ("MFR", ASTM D1238 230° C., 2.16 kg) of at least 20, or 40, or 60 g/10 min, or within a range from 30, or 50, or 80 g/10 min to 160, or 180, or 200 g/10 min, an Mw/Mn within a range from 7 to 16, an Mz/Mw within a range from 7 to 16, and comprising 1.1, or 1.0, or 0.9 wt % or less of atactic polypropylene based on the total weight of the homopolypropylene and atactic polypropylene. The homopolypropylene can be the continuous phase of an impact copolymer that includes a propylene-α-olefin copolymer.

Also disclosed is an impact copolymer having a MFR of at least 20 g/10 min, or within a range from 20, or 40, or 60 g/10 min to 140, or 160 g/10 min comprising (or consisting of, or consisting essentially of) a homopolypropylene and within a range from 2, or 4 wt % to 8, or 10, or 12, or 18, or 20, or 30 wt % of an propylene-α-olefin copolymer by weight of the impact copolymer; wherein the homopolypropylene has a MFR within a range from 30, or 50, or 80 g/10 min to 160, or 180, or 200 g/10 min, an Mw/Mn within a range from 7 to 16, an Mz/Mw within a range from 7 to 16, and comprising 1.1, or 1.0, or 0.9 wt % or less atactic polypropylene based on the total weight of the homopolypropylene and atactic polypropylene; and the propylene-α-olefin copolymer has within a range from 30, or 35 wt % to 45, or 50 wt % α-olefin derived units propylene-α-olefin copolymer, and an intrinsic viscosity ("IV") within a range from 4 to 8 dL/g.

In any embodiment the polypropylene and/or ICP is obtained by combining a Ziegler-Natta catalyst with propylene in two slurry polymerization reactors in series to produce the homopolypropylene, followed by, in the case of the ICP, combining the homopolypropylene and Ziegler-Natta catalyst with propylene and an α-olefin in a gas phase reactor to produce a propylene-α-olefin copolymer imbedded within the pores of, and/or blended with the homopolypropylene. In any embodiment the polymerization reactors have different hydrogen concentrations, thus producing homopolypropylenes with different molecular weights.

Also in any embodiment the polypropylene is obtained by combining a Ziegler-Natta catalyst having at least two different internal electron donors.

DETAILED DESCRIPTION

It has been found that an improved ICP can be obtained by conducting olefin (co)polymerization using a catalyst that is obtained by bringing at least a magnesium compound, titanium halide compound, a phthalate and an alkylidene malonate compound into contact with each other. Specifically, disclosed herein is a method for producing a homopolypropylene and an impact copolymer including the homopolypropylene using a Ziegler-Natta-type solid catalyst for olefin (co)polymerization that includes bringing a magnesium compound, tetravalent titanium halide compound, an organic compound represented the following general formula (1):

$$R^1{}_k(C_6H_{4-k})(COOR^2)(COOR^3), \qquad (1)$$

and an organic compound represented the following general formula (2):

$$R^4R^5C=C(COOR^6)(COOR^7), \qquad (2)$$

wherein $R^1$ is a halogen atom or an alkyl group having 1 to 8 carbon atoms, $R^2$ and $R^3$ are a linear alkyl group having 1 to 6 carbon atoms, provided that $R^2$ and $R^3$ are either identical or different, and "k" is an integer from 0 to 4, provided that a plurality of $R^1$ are either identical or different when "k" is an integer from 2 to 4;

wherein $R^4$ and $R^5$ are independently an atom or group selected from a hydrogen atom, halogen, a linear alkyl group having 1 to 20 carbon atoms, a branched alkyl group having 3 to 20 carbon atoms, a vinyl group, a linear or branched alkenyl group having 3 to 20 atoms, a cycloalkenyl group having 3 to 20 carbon atoms, an aromatic hydrocarbon group having 6 to 20 carbon atoms, provided that $R^4$ and $R^5$ optionally bond to each other to form a ring, and the number of carbon atoms of $R^5$ is 2 or more when $R^4$ is a hydrogen atom or a methyl group; and wherein $R^6$ and $R^7$ are independently a linear alkyl group having 1 to 20 carbon atoms, a branched alkyl group having 3 to 20 carbon atoms, a vinyl group, a linear or branched alkenyl group having 3 to 20 carbon atoms, a cycloalkyl group having 3 to 20 carbon atoms, a cycloalkenyl group having 3 to 20 carbon atoms, or an aromatic hydrocarbon group having 6 to 20 carbon atoms.

Also described herein is an olefin polymerization catalyst includes (I) a solid catalyst component for olefin polymerization obtained by the method described herein, (II) an organoaluminum compound represented by the following general formula (3):

  (3)

and (III) an external donor compound represented by the following general formula (4) and an external donor compound represented by the following general formula (5):

  (4)

  (5)

wherein $R^8$ is an alkyl group having 1 to 6 carbon atoms; "q" is a hydrogen atom or halogen atom; and "p" is an integer from 0 to 3;

wherein $R^9$ is an alkyl group having 1 to 12 carbon atoms, a cycloalkyl group having 3 to 12 carbon atoms, a phenyl group, a vinyl group, an allyl group, or an arylalkyl group, provided that a plurality of $R^9$ are either identical or different when a plurality of $R^9$ are present;

$R^{10}$ is an alkyl group having 1 to 4 carbon atoms, a cycloalkyl group having 3 to 6 carbon atoms, a phenyl group, a vinyl group, an allyl group, or an arylalkyl group, provided that a plurality of $R^{10}$ are either identical or different when a plurality of $R^{10}$ are present; and "q" is an integer from 0 to 3;

$R^{11}$ and $R^{12}$ are independently a hydrogen atom, a linear alkyl group having 1 to 20 carbon atoms, a branched alkyl group having 3 to 20 carbon atoms, a vinyl group, an allyl group, or an arylalkyl group, a cycloalkyl group having 3 to 20 carbon atoms, or aryl group, provided that $R^{11}$ and $R^{12}$ are either identical or different, and optionally bond to each other to form a ring; and $R^{13}$ is a linear alkyl group having 1 to 20 carbon atoms, a branched alkyl group having 3 to 20 carbon atoms, a vinyl group, an allyl group, or an arylalkyl group, a linear or branched alkoxy group having 1 to 20 carbon atoms, a vinyloxy group, an allyloxy group, a cycloalkyl group having 3 to 20 carbon atoms, an aryl group, or an aryloxy group, provided that a plurality of $R^{13}$ are either identical or different when a plurality of $R^{13}$ are present; and "s" is an integer from 0 to 3.

When the solid catalyst component for olefin polymerization described herein used to produce a propylene polymer or propylene-based ICP, these polymers have high isotacticity and broad molecular weight distribution (Mw/Mn). Therefore the flexural modulus of the resulting (co) polymer is improved as compared with homopolypropylenes and ICP's using a known solid catalyst component.

The method for producing solid catalyst for olefin (co) polymerization (hereinafter may be referred to as solid catalyst component (I)") described herein includes bringing a magnesium compound, a tetravalent titanium halide compound, an electron donor compound represented by the general formula (1) and an electron donor compound represented by the general formula (2) into contact with each other, reacting a magnesium compound, a tetravalent titanium halide compound, an electron donor compound represented by the general formula (1) and an electron donor compound represented by the general formula (2) to obtain a solid component.

The magnesium compound (a) (hereinafter may be referred to as "component (a)" or "magnesium compound (a)") may be one or more compounds selected from a magnesium dihalide, a dialkylmagnesium, an alkylmagnesium halide, a dialkoxymagnesium, a diaryloxymagnesium, an alkoxymagnesium halide, a fatty acid magnesium salt, and the like. Among these, a magnesium dihalide, a mixture of a magnesium dihalide and a dialkoxymagnesium, and a dialkoxymagnesium are preferable, and a dialkoxymagnesium is particularly preferable.

Examples of the dialkoxymagnesium include dimethoxymagnesium, diethoxymagnesium, dipropoxymagnesium, dibutoxymagnesium, ethoxymethoxymagnesium, ethoxypropoxymagnesium, butoxyethoxymagnesium, and the like. These dialkoxymagnesiums may be produced by reacting magnesium metal with an alcohol in the presence of a halogen, a halogen-containing metal compound, or the like. These dialkoxymagnesiums may be used either alone or in combination.

It is preferable to use a granular or powdery dialkoxymagnesium when producing the solid catalyst component used as described herein. The dialkoxymagnesium may have an indefinite shape or a spherical shape. For example, when using a spherical dialkoxymagnesium, a polymer powder obtained by polymerization has a better particle shape and a narrow particle size distribution. This improves the handling capability of the polymer powder during polymerization, and eliminates problems such as clogging caused by a fine powder included in the polymer powder.

The spherical dialkoxymagnesium need not necessarily have a perfect spherical shape, but may have an elliptical shape. The "sphericity" ratio (1/w) of the major axis diameter 1 to the minor axis diameter "w" of the spherical dialkoxymagnesium is 3, or 2, or 1.5, or 1.3, or 1.25, or 1.2 or less, preferably 1 to 2, and more preferably 1 to 1.5.

The average particle size $D_{50}$ (i.e., the particle size at 50% in the cumulative volume particle size distribution) of the dialkoxymagnesium measured using a laser diffraction/scattering particle size distribution analyzer. The average particle size of the spherical dialkoxymagnesium is average particle size within a range from 1, or 5, or 10, or 20, or 40 μm to 50, or 60, or 80, or 100, or 120, or 150, or 200 μm. It is preferable that the spherical dialkoxymagnesium have a narrow particle size distribution, and have a low fine powder content and a low coarse powder content. More specifically, it is preferable that the spherical dialkoxymagnesium have a content of particles having a particle size (measured using a laser diffraction/scattering particle size distribution analyzer) equal to or less than 5 μm of 20% or less, and more preferably 10% or less. It is preferable that the spherical dialkoxymagnesium have a content of particles having a particle size equal to or more than 100 μm of 10% or less, and more preferably 5% or less.

The particle size distribution ln($D_{90}/D_{10}$) (where, $D_{90}$ is the particle size at 90% in the cumulative volume particle size distribution, and $D_{10}$ is the particle size at 10% in the cumulative volume particle size distribution) of the spherical dialkoxymagnesium is preferably 3 or less, and more preferably 2 or less. The spherical dialkoxymagnesium may be produced using the method disclosed in JP-A-58-41832, JP-A-62-51633, JP-A-3-74341, JP-A-4-368391, JP-A-8-73388, or the like.

Examples of the titanium compound (b) (hereinafter may be referred to as "component (b)" or "titanium halide compound (b)") include a tetravalent titanium compound represented by the following general formula (6):

$$Ti(OR^{14})_t X_{4-t} \qquad (6)$$

wherein $R^{14}$ is a hydrocarbon group having 1 to 10 carbon atoms, provided that a plurality of $R^{14}$ are either identical or different when a plurality of $OR^{14}$ are present, "X" is a halogen group, provided that a plurality of "X" are either identical or different when a plurality of "X" are present, and "t" is an integer from 0 to 4.

The tetravalent titanium compound represented by the general formula (6) is one compound, or two or more compounds, selected from an alkoxytitanium, a titanium halide, and an alkoxytitanium halide. Specific examples of the tetravalent titanium compound include titanium tetrahalides such as titanium tetrafluoride, titanium tetrachloride, titanium tetrabromide, and titanium tetraiodide, alkoxytitanium trihalides such as methoxytitanium trichloride, ethoxytitanium trichloride, propoxytitanium trichloride, and n-butoxytitanium trichloride, dialkoxytitanium dihalides such as dimethoxytitanium dichloride, diethoxytitanium dichloride, dipropoxytitanium dichloride, and di-n-butoxytitanium dichloride, and trialkoxytitanium halides such as trimethoxytitanium chloride, triethoxytitanium chloride, tripropoxytitanium chloride, and tri-n-butoxytitanium chloride. Among these, halogen-containing titanium compounds are preferable, titanium tetrahalides such as titanium tetrachloride, titanium tetrabromide, and titanium tetraiodide are more preferable, and titanium tetrachloride is particularly preferable. These titanium compounds may be used either alone or in a combination. The tetravalent titanium compound represented by the general formula (6) may be used in a state in which the tetravalent titanium compound is diluted with a hydrocarbon compound, a halogenated hydrocarbon compound, or the like.

The electron donor compound represented by the general formula (1) (hereinafter may be referred to as "compound (c)" or "electron donor compound (c)") includes a phthalic diester, substituted phthalic diester, a halogen-substituted phthalic diester, an alkyl-substituted phthalic diester, and a haloalkoxyl-substituted phthalic diester.

Examples of the alkyl group having 1 to 8 carbon atoms represented by $R^1$ in general formula (1) include a methyl group, an ethyl group, a n-propyl group, an isopropyl group, a n-butyl group, an isobutyl group, a t-butyl group, a n-pentyl group, an isopentyl group, a neopentyl group, a n-hexyl group, am isohexyl group, a 2,2-dimethylbutyl group, a 2,2-dimethylpentyl group, an isooctyl group, and a 2,2-dimethylhexyl group. Examples of the halogen atom represented by $R^1$ include a fluorine atom, a chlorine atom, a bromine atom, and an iodine atom. $R^1$ is preferably a methyl group, a bromine atom, or fluorine atom, and more preferably a methyl group or a bromine atom.

Examples of the alkyl group having 1 to 6 carbon atoms represented by $R^2$ and $R^3$ include a methyl group, an ethyl group, a n-propyl group, an isopropyl group, a n-butyl group, an isobutyl group, a t-butyl group, a n-pentyl group, an isopentyl group, a neopentyl group, a n-hexyl group, and an isohexyl group. Among these, ethyl group, a n-propyl group, a n-butyl group, and an isobutyl group are preferable. Further, "k" that is the number of substituents $R^1$ is 0, 1, or 2, where $R^1$ are either identical or different when "k" is 2. In this case, it is preferable $R^1$ substitute the hydrogen atoms at the positions 4 and 5 of the benzene ring in the formula (1). When "k" is 1, it is preferable $R^1$ substitutes the hydrogen atom at the position 3, 4, or 5 of the benzene ring in the general formula (1).

Specific examples of the phthalic diester include dimethyl phthalate, diethyl phthalate, di-n-propyl phthalate, diisopropyl phthalate, di-n-butyl phthalate, ethylmethyl phthalate, methyl(isopropyl) phthalate, ethyl(n-propyl) phthalate, ethyl (n-butyl) phthalate, ethyl(isobutyl) phthalate, di-n-pentyl phthalate, diisopentyl phthalate, dineopentyl phthalate, and di-n-hexyl phthalate. These compounds may be used either alone or in combination.

Specific examples of the substituted phthalic diester include diethyl 4-methylphthalate, di-n-butyl 4-methylphthalate, diisobutyl 4-methylphthalate, dineopentyl 4-bromophthalate, diethyl 4-bromophthalate, di-n-butyl 4-bromophthalate, diisobutyl 4-bromophthalate, dineopentyl 4-methylphthalate, dineopentyl 4,5-dimethylphthalate, dineopentyl 4-methylphthalate, dineopentyl 4-ethylphthalate, t-butylneopentyl 4-methylphthalate, t-butylneopentyl 4-ethylphthalate, dineopentyl 4,5-diethylphthalate, t-butylneopentyl 4,5-dimethylphthalate, t-butylneopentyl 4,5-diethylphthalate, dineopentyl 3-fluorophthalate, dineopentyl 3-chlorophthalate, and dineopentyl 3-fluorophthalate, dineopentyl 4-bromophthalate.

The above esters may preferably be used in combination. In this case, the esters are preferably combined so that the total number of carbon atoms of the alkyl group(s) of one ester differs from that of another ester by 4 or more.

The electron donor compound represented by the general formula (2) (hereinafter may be referred to as "compound (d)" or "electron donor compound (d)") is an alkylidene malonate compound represented by the formula (2):

$$R^4R^5C=C(COOR^6)(COOR^7) \qquad (2)$$

wherein $R^4$ and $R^5$ are independently an atom or a group selected from a hydrogen atom, a halogen, a linear alkyl group having 1 to 20 carbon atoms, a branched alkyl group having 3 to 20 carbon atoms, a vinyl group, a linear or branched alkenyl group having 3 to 20 carbon atoms, a linear or branched halogen-substituted alkyl group having 2 to 20 carbon atoms, a cycloalkyl group having 3 to 20 carbon atoms, a cycloalkenyl group having 3 to 20 carbon atoms, an aromatic hydrocarbon group having 6 to 20 carbon atoms, a nitrogen-containing group, an oxygen-containing group, a phosphorus-containing group, and a silicon-containing group, provided that $R^4$ and $R^5$ are either identical or different, and optionally bond to each other to form a ring, and $R^5$ has 2 or more carbon atoms when $R^4$ is a hydrogen atom or a methyl group, and $R^6$ and $R^7$ are independently a linear alkyl group having 1 to 20 carbon atoms, a branched alkyl group having 3 to 20 carbon atoms, a vinyl group, a linear or branched alkenyl group having 3 to 20 carbon atoms, a cycloalkyl group having 3 to 20 carbon atoms, a cycloalkenyl group having 3 to 20 carbon atoms, or an aromatic hydrocarbon group having 6 to 20 carbon atoms, provided that $R^6$ and $R^7$ are either identical or different.

Examples of the halogen in the general formula (2) include fluorine, chlorine, bromine, and iodine. Among these, chlorine, bromine, and iodine are preferable, and chlorine and bromine are particularly preferable. Examples of the linear alkyl group having 1 to 20 carbon atoms include a methyl group, an ethyl group, a n-propyl group, a n-butyl group, a n-pentyl group, a n-hexyl group, a n-heptyl group, a n-octyl group, an n-nonyl group, an n-decyl group, and the like.

Examples of the branched alkyl group having 3 to 20 carbon atoms in the general formula (2) include alkyl groups that include a secondary carbon atom or a tertiary carbon atom (e.g., isopropyl group, isobutyl group, t-butyl group, isopentyl group, and neopentyl group). Examples of the linear alkenyl group having 3 to 20 carbon atoms in the general formula (2) include an n-propenyl group, an n-butenyl group, an n-pentenyl group, an n-hexenyl group, an n-heptenyl group, an n-octenyl group, an n-nonenyl group, an n-decenyl group, and the like. Examples of the branched alkenyl group having 3 to 20 carbon atoms include alkenyl groups that include a secondary carbon atom or a tertiary carbon atom (e.g., isopropenyl group, isobutenyl group, t-butenyl group, isopentenyl group, and neopentenyl group).

Examples of the linear or branched halogen-substituted alkyl group having 2 to 20 carbon atoms include a methyl halide group, an ethyl halide group, an n-propyl halide group, an isopropyl halide group, an n-butyl halide group, an isobutyl halide group, an n-pentyl halide group, an n-hexyl halide group, an n-heptyl halide group, an n-octyl halide group, a nonyl halide group, and a decyl halide group. Examples of the halogen include fluorine, chlorine, bromine, and iodine.

Examples of the cycloalkyl group having 3 to 20 carbon atoms in the general formula (2) include a cyclopropyl group, a cyclobutyl group, a cyclopentyl group, a cyclohexyl group, a cycloheptyl group, a cyclooctyl group, a cyclononyl group, a cyclodecyl group, and the like. Examples of the cycloalkenyl group having 3 to 20 carbon atoms include a cyclopropenyl group, a cyclobutenyl group, a cyclopentenyl group, a cyclohexenyl group, a cycloheptenyl group, a cyclooctenyl group, a cyclononenyl group, a cyclodecenyl group, and the like.

Examples of the aromatic hydrocarbon group having 6 to 20 carbon atoms in the general formula (2) include a phenyl group, a methylphenyl group, a dimethylphenyl group, an ethylphenyl group, a benzyl group, a 1-phenylethyl group, a 2-phenylethyl group, a 2-phenylpropyl group, a 1-phenylbutyl group, a 4-phenylbutyl group, a 2-phenylheptyl group, a tolyl group, a xylyl group, a naphthyl group, and the like.

The number of carbon atoms of $R^5$ is 2 or more when $R^4$ is a hydrogen atom or a methyl group. $R^4$ and $R^5$ in the general formula (2) optionally bond to each other to form a ring. Examples of a ring formed by $R^4$, $R^5$ and the carbon atom bonded to $R^4$ and $R^5$ include a cycloalkyl ring, a fluorenyl ring, an indenyl ring, an imidazole ring, a piperidinyl ring, and the like.

It is preferable that $R^4$ and $R^5$ in the general formula (2) be a hydrogen atom, a linear alkyl group having 1 to 6 carbon atoms, a branched alkyl group having 3 to 6 carbon atoms, a vinyl group, a linear or branched alkenyl group having 3 to 6 carbon atoms, a cycloalkyl group having 5 or 6 carbon atoms, a cycloalkenyl group having 5 or 6 carbon atoms, or an aromatic hydrocarbon group having 6 to 10 carbon atoms. It is particularly preferable that $R^4$ be a hydrogen atom or a linear alkyl group having 1 to 6 carbon atoms, and $R^5$ be a linear alkyl group having 1 to 6 carbon atoms, a branched alkyl group having 3 to 6 carbon atoms, a cycloalkyl group having 5 or 6 carbon atoms, or an aromatic hydrocarbon group having 6 to 10 carbon atoms. It is preferable that $R^6$ and $R^7$ be a linear alkyl group having 1 to 10 carbon atoms or a branched alkyl group having 3 to 8 carbon atoms. It is particularly preferable that $R^6$ and $R^7$ be a linear alkyl group having 1 to 4 carbon atoms or a branched alkyl group having 3 or 4 carbon atoms.

Examples of a preferable ester compound (d) represented by the general formula (1) include dimethyl propylidenemalonate, diethyl propylidenemalonate, di-n-propyl propylidenemalonate, diisobutyl propylidenemalonate, and di-n-butyl propylidenemalonate; dimethyl butylidenemalonate, diethyl butylidenemalonate, di-n-propyl butylidenemalonate, diisobutyl butylidenemalonate, and di-n-butyl butylidenemalonate; dimethyl pentylidenemalonate, diethyl pentylidenemalonate, di-n-propyl pentylidenemalonate, diisobutyl pentylidenemalonate, and di-n-butyl pentylidenemalonate; dimethyl hexylidenemalonate, diethyl hexylidenemalonate, di-n-propyl hexylidenemalonate, diisobutyl hexylidenemalonate, and di-n-butyl hexylidenemalonate; dimethyl(2-methylpropylidene)malonate, diethyl(2-methylpropylidene)malonate, di-n-propyl(2-methylpropylidene)malonate, diisobutyl(2-methylpropylidene)malonate, di-n-butyl(2-methylpropylidene)malonate, and diethyl(2,2-dimethylpropylidene)malonate; dimethyl(2-methylbutylidene)malonate, diethyl(2-methylbutylidene)malonate, di-n-propyl(2-methylbutylidene)malonate, diisobutyl(2-methylbutylidene)malonate, and di-n-butyl(2-methylbutylidene)malonate; dimethyl(2-ethylbutylidene)malonate, diethyl(2-ethylbutylidene)malonate, di-n-propyl(2-ethylbutylidene)malonate, diisobutyl(2-ethylbutylidene)malonate, and di-n-butyl(2-ethylbutylidene)malonate; dimethyl(2-ethylpentylidene)malonate, diethyl(2-ethylpentylidene)malonate, di-n-propyl(2-ethylpentylidene)malonate, diisobutyl(2-ethylpentylidene)malonate, and di-n-butyl(2-ethylpentylidene)malonate; dimethyl(2-isopropylbutylidene)malonate, diethyl(2-isopropylbutylidene)malonate, di-n-propyl(2-isopropylbutylidene)malonate, diisobutyl(2-isopropylbutylidene)malonate, and di-n-butyl(2-isopropylbutylidene)malonate; dimethyl(3-methylbutylidene)malonate, diethyl(3-methylbutylidene)malonate, di-n-propyl(3-methylbutylidene)malonate, diisobutyl(3-methylbutylidene)malonate, and di-n-butyl(3-methylbutylidene)malonate; dimethyl(2,3-dimethylbutylidene)malonate, diethyl(2,3-dimethylbutylidene)malonate, di-n-propyl(2,3-dimethylbutylidene)malonate, diisobutyl(2,3-dimethylbutylidene)malonate, and di-n-butyl(2,3-dimethylbutylidene)malonate; dimethyl(2-n-propylbutylidene)malonate, diethyl(2-n-propylbutylidene)malonate, di-n-propyl(2-n-propylbutylidene)malonate, diisobutyl(2-n-propylbutylidene)malonate, and di-n-butyl(2-n-propylbutylidene)malonate; dimethyl(2-isobutyl-3-methylbutylidene)malonate, diethyl(2-isobutyl-3-methylbutylidene)malonate, di-n-propyl(2-isobutyl-3-methylbutylidene)malonate, diisobutyl(2-isobutyl-3-methylbutylidene)malonate, and di-n-butyl(2-isobutyl-3-methylbutylidene)malonate; dimethyl(2-n-butylpentylidene)malonate, diethyl(2-n-butylpentylidene)malonate, di-n-propyl(2-n-butylpentylidene)malonate, diisobutyl(2-n-butylpentylidene)malonate, and di-n-butyl(2-n-butylpentylidene)malonate; dimethyl(2-n-pentylhexylidene)malonate, diethyl(2-n-pentylhexylidene)malonate, di-n-propyl(2-n-pentylhexylidene)malonate, diisobutyl(2-n-pentylhexylidene)malonate, and di-n-butyl(2-n-pentylhexylidene)malonate; dimethyl(cyclohexylmethylene)malonate, diethyl(cyclohexylmethylene)malonate, di-n-propyl(cyclohexylmethylene)malonate, diisobutyl(cyclohexylmethylene)malonate, and di-n-butyl(cyclohexylmethylene)malonate; dimethyl(cyclopentylmethylene)malonate, diethyl(cyclopentylmethylene)malonate, di-n-propyl(cyclopentylmethylene)malonate, diisobutyl(cyclopentylmethylene)malonate, and di-n-butyl(cyclopentylmethylene)malonate; dimethyl(1-methylpropylidene)malonate, diethyl(1-methylpropylidene)malonate, di-n-propyl(1-methylpropylidene)malonate, diisobutyl(1-methylpropylidene)malonate, and di-n-butyl(1-methylpropylidene)malonate; dimethyl(di-t-butylmethylene)malonate, diethyl(di-t-butylmethylene)malonate, di-n-propyl(di-t-butylmethylene)malonate, diisobutyl(di-t-butylmethylene)malonate, and di-n-butyl(di-t-butylmethylene)malonate; dimethyl(diisobutylmethylene)malonate, diethyl(diisobutylmethylene)malonate, di-n-propyl(diisobutylmethylene)malonate, diisobutyl(diisobutylmethylene)malonate, and di-n-butyl(diisobutylmethylene)malonate; dimethyl(diisopropylmethylene)malonate, diethyl(diisopropylmethylene)malonate, di-n-propyl(diisopropylmethylene)malonate, diisobutyl(diisopropylmethylene)malonate, and di-n-butyl(diisopropylmethylene)malonate; dimethyl(dicyclopentylmethylene)malonate, diethyl(dicyclopentylmethylene)malonate, di-n-propyl(dicyclopentylmethylene)malonate, diisobutyl(dicyclopentylmethylene)malonate, and di-n-butyl(dicyclopentylmethylene)malonate; dimethyl(dicyclohexylmethylene)malonate, diethyl(dicyclohexylmethylene)malonate, di-n-propyl(dicyclohexylmethylene)malonate, diisobutyl(dicyclohexylmethylene)malonate, and di-n-butyl(dicyclohexylmethylene)malonate; dimethyl benzylidenemalonate, diethyl benzylidenemalonate, di-n-propyl benzylidenemalonate, diisobutyl benzylidenemalonate, and di-n-butyl benzylidenemalonate; dimethyl(1-methylbenzylidene)malonate, diethyl(1-methylbenzylidene)malonate, di-n-propyl(1-methylbenzylidene)malonate, diisobutyl(1-methylbenzylidene)malonate, and di-n-butyl(1-methylbenzylidene)malonate; dimethyl(1-ethylbenzylidene)malonate, diethyl(1-ethylbenzylidene)malonate, di-n-propyl(1-ethylbenzylidene)malonate, diisobutyl(1-ethylbenzylidene)malonate, and di-n-butyl(1-ethylbenzylidene)malonate; dimethyl(1-n-propylbenzylidene)malonate, diethyl(1-n-propylbenzylidene)malonate, di-n-propyl(1-n-propylbenzylidene)malonate, diisobutyl(1-n-propylbenzylidene)malonate, and di-n-butyl(1-n-propylbenzylidene)malonate; dimethyl(1-isopropylbenzylidene)malonate, diethyl(1-isopropylbenzylidene)malonate, di-n-propyl(1-isopropylbenzylidene)malonate, diisobutyl(1-isopropylbenzylidene)malonate, and di-n-butyl(1-isopropylbenzylidene)malonate; dimethyl(1-n-butylbenzylidene)malonate, diethyl(1-n-butylbenzylidene)malonate, di-n-propyl(1-n-butylbenzylidene)malonate, diisobutyl(1-n-butylbenzylidene)malonate, and di-n-butyl(1-n-butylbenzylidene)malonate; dimethyl(1-isobutylbenzylidene)malonate, diethyl(1-isobutylbenzylidene)malonate, di-n-propyl(1-isobutylbenzylidene)malonate, and di-n-butyl(1-isobutylbenzylidene)malonate; dimethyl(1-t-butylbenzylidene)malonate, diethyl(1-t-butylbenzylidene)malonate, di-n-propyl(1-t-butylbenzylidene)malonate, diisobutyl(1-t-butylbenzylidene)malonate, and di-n-butyl(1-t-butylbenzylidene)malonate; dimethyl(1-n-pentylbenzylidene)malonate, diethyl(1-n-pentylbenzylidene)malonate, di-n-propyl(1-n-pentylbenzylidene)malonate, diisobutyl(1-n-pentylbenzylidene)malonate, and di-n-butyl(1-n-pentylbenzylidene)malonate; dimethyl(2-methylphenylmethylene)malonate, diethyl(2-methylphenylmethylene)malonate, di-n-propyl(2-methylphenylmethylene)malonate, diisobutyl(2-methylphenylmethylene)malonate, and di-n-butyl(2-methylphenylmethylene)malonate; dimethyl(2,6-dimethylphenylmethylene)malonate, diethyl(2,6-dimethylphenylmethylene)malonate, di-n-propyl(2,6-dimethylphenylmethylene)malonate, diisobutyl(2,6-dimethylphenylmethylene)malonate, and di-n-butyl(2,6-dimethylphenylmethylene)malonate; dimethyl(1-methyl-1-(2-methylphenyl)methylene)malonate, diethyl(1-methyl-1-(2-methylphenyl)methylene)malonate, di-n-propyl(1-methyl-1-(2-methylphenyl)methylene)malonate, diisobutyl(1-methyl-1-(2-methylphenyl)methylene)malonate, and di-n-butyl(1-methyl-1-(2-methylphenyl)methylene)malonate; dimethyl(2-methylcyclohexylmethylene)malonate, diethyl(2-methylcyclohexylmethylene)malonate, di-n-propyl(2-methylcyclohexylmethylene)malonate, diisobutyl(2-methylcyclohexylmethylene)malonate, and di-n-butyl(2-methylcyclohexylmethylene)malonate; dimethyl(2,6-dimethylcyclohexylmethylene)malonate, diethyl(2,6-dimethylcyclohexylmethylene)malonate, di-n-propyl(2,6-dimethylcyclohexylmethylene)malonate, diisobutyl(2,6-dimethylcyclohexylmethylene)malonate, and di-n-butyl(2,6-dimethylcyclohexylmethylene)malonate; dimethyl(1-methyl-1-(2-methylcyclohexyl)methylene)malonate, diethyl(1-methyl-1-(2-methylcyclohexyl)methylene)malonate, di-n-propyl(1-methyl-1-(2-methylcyclohexyl)methylene)malonate, diisobutyl(1-methyl-1-(2-methylcyclohexyl)methylene)malonate, and di-n-butyl(1-methyl-1-(2-methylcyclohexyl)methylene)malonate; dimethyl(naphthylmethylene)malonate, diethyl(naphthylmethylene)malonate, di-n-propyl(naphthylmethylene)malonate, diisobutyl(naphthylmethylene)malonate, and di-n-butyl(naphthylmethylene)malonate; dimethyl(1-n-hexylbenzylidene)malonate, diethyl(1-n-hexylbenzylidene)malonate, di-n-propyl(1-n-hexylbenzylidene)malonate, diisobutyl(1-n-hexylbenzylidene)malonate, and di-n-butyl(1-n-hexylbenzylidene)malonate. These compounds may be used either alone or in combination.

Desirably, two kinds of electron donor of compounds, electron donor compound (c) and electron donor compound (d), are fed during the reaction of magnesium compound (a) and titanium halide compound (b) simultaneously, or step by step. If the reaction steps between magnesium compound (a) and titanium halide compound (b) are plural, electron donor compound (c) and electron donor compound (d) are fed at the same reaction step or the different steps each by each. If they are fed at the different steps, the order of electron donor compound (c) and electron donor compound (d) are not restricted. Preferably electron donor compound (c) are fed at the first step, and compound (d) are fed simultaneously at the first step, or at the latter steps. More preferably both electron donor compound (c) and electron donor compound (d) are fed at least at the first step simultaneously or step by step. Electron donor compound (c) and electron donor compound (d) can be used not only one time but also several times and at several steps.

The content of titanium, magnesium, the halogen (halogen atoms), the component (c), and component (d) in the solid catalyst component (I) is not particularly limited. The content of titanium in the solid catalyst component (I) is 0.1 to 10 wt %, preferably 0.5 to 8.0 wt %, and more preferably 1.0 to 5.0 wt %. The content of magnesium in the solid catalyst component (I) is 10 to 40 wt %, preferably 10 to 30 wt %, and more preferably 13 to 25 wt %. The content of the halogen (halogen atoms) in the solid catalyst component (I) is 20 to 89 wt %, preferably 30 to 85 wt %, and more preferably 40 to 75 wt %. The content of the electron donor component (c) in the solid catalyst component (I) is 0.5 to 40 wt %, preferably 1 to 30 wt %, and more preferably 2 to 25 wt %. The content of the electron donor component (d) in the solid catalyst component (I) is 0.5 to 20 wt %, preferably 1 to 15 wt %, and more preferably 2 to 10 wt %. As used herein, "wt %" is the percent by weight of a given component relative to the total weight of the combination of components.

Examples and specific examples of the organosilicon compound that includes a Si—O—C linkage and the organosilicon compound that includes a Si—N—C linkage include those mentioned later in connection with the organosilicon compound represented by the general formula (4) and the organosilicon compound represented by the general formula (5). Examples of the organoaluminum compound include those mentioned later in connection with the organoaluminum compound represented by the general formula (3). These reagents may be used either alone or in combination.

The term "unsaturated alkyl group" refers to a vinyl group or an alkenyl group. Examples of the organosilicon compound include vinyl group-containing alkylsilanes, vinyl group-containing alkoxysilanes, vinyl group-containing cycloalkylsilanes, vinyl group-containing phenylsilanes, vinyl group-containing halogenated silanes, vinyl group-containing halogenated alkylsilanes, alkenyl group-containing vinylsilanes, alkenyl group-containing alkylsilanes, alkenyl group-containing alkoxysilanes, alkenyl group-containing cycloalkylsilanes, alkenyl group-containing phenylsilanes, alkenyl group-containing halogenated silanes, and alkenyl group-containing halogenated alkylsilanes. The vinyl group is represented by $CH_2=CH-$, and the alkenyl group is represented by $CH_2=CH-(CH_2)_u-$. Among these, vinyltrialkylsilanes, allyltrialkylsilanes, divinyldialkylsilanes, diallyldialkylsilanes, trivinylalkylsilanes, and triallylalkylsilanes are preferable, and allyldimethylvinylsilane, diallyldimethylsilane, triallylmethylsilane, di-3-butenyldimethylsilane, diallyldichlorosilane, and allyltriethylsilane are particularly preferable. These organosilicon compounds that include an unsaturated alkyl group may be used either alone or in combination.

Method for Producing Solid Catalyst Component (I) for Copolymerization

The solid catalyst component (I) is produced by bringing a magnesium compound (a), a tetravalent titanium halide compound (b), an optional halogen compound other than the titanium compound, the compound (c) represented by the general formula (1), and the compound (d) represented by the general formula (2) into contact with each other.

In any embodiment the method comprises: (i) a first step that brings a magnesium compound and a tetravalent titanium halide compound into contact with each other to make a reaction, followed by removing the reaction medium and optionally washing; (ii) a second step that brings a tetravalent titanium halide compound into contact with a product obtained by the first step to make a reaction, followed by removing the reaction medium and optionally washing; (iii) wherein compounds selected respectively from an organic compound represented by the following general formula (1) and an organic compound represented by the following general formula (2) are further added in at least either of the first step and the second step.

Also in any embodiment the method further comprises a third step that brings an organic compound represented by the following general formula (1) and an organic compound represented by the following general formula (2) into contact with a product obtained by the above mentioned second step to make a reaction, followed by removing the reaction medium and optionally washing.

A saturated hydrocarbon solvent or an unsaturated hydrocarbon solvent that does not dissolve a magnesium compound is used as a medium that cannot dissolve the component (a).

The saturated hydrocarbon solvent or the unsaturated hydrocarbon solvent is safe and has high industrial versatility. Examples of the saturated hydrocarbon solvent or the unsaturated hydrocarbon solvent include a linear or branched aliphatic hydrocarbon compound having a boiling point of 50 to 200° C., such as hexane, heptane, decane, and methylheptane, an alicyclic hydrocarbon compound having a boiling point of 50 to 200° C., such as cyclohexane, ethylcyclohexane, and decahydronaphthalene, and an aromatic hydrocarbon compound having a boiling point of 50 to 200° C., such as toluene, xylene, and ethylbenzene. Among these, a linear aliphatic hydrocarbon compound having a boiling point of 50 to 200° C. (e.g., hexane, heptane, and decane), and an aromatic hydrocarbon compound having a boiling point of 50 to 200° C. (e.g., toluene, xylene, and ethylbenzene) are preferable. These solvents may be used either individually or in combination.

The component (a) used to produce the solid catalyst component (I) is the same as the component (a) included in the solid catalyst component (I), and description thereof is omitted. The titanium component (b) used to produce the solid catalyst component (I) is the same as the titanium component (b) included in the solid catalyst component (I), and description thereof is omitted. A halide compound other than the titanium component (b) that is optionally used to produce the solid catalyst component (I) is the same as the halide compound that is optionally included in the solid catalyst component (I), and description thereof is omitted. The electron donor component (c) and electron donor component (d) used to produce the solid catalyst component (I) is the same as the electron donor component (c) and electron donor component (d) included in the solid catalyst component (I), and description thereof is omitted.

An electron donor component that is optionally used to produce the solid catalyst component (I) is the same as the external electron donor compound (f) that is discussed later, and description thereof is omitted. A summary of exemplary methods is as follows:

(1) A dialkoxymagnesium is suspended in a hydrocarbon solvent, and brought into contact with titanium tetrachloride. The mixture is heated, and brought into contact with the component (a) and the component (b) (optional) (either simultaneously or successively) to obtain a solid product. The solid product is washed with a hydrocarbon solvent, and brought into contact with titanium tetrachloride in the presence of a hydrocarbon solvent to produce the solid catalyst component (I). In this case, the solid component may be heated in the presence or absence of a hydrocarbon solvent. A treatment with the component (b) may optionally be added.

(2) A dialkoxymagnesium is suspended in a hydrocarbon solvent, and brought into contact with (reacted with) a titanium halide, the component (a), and the component (b) (optional) to obtain a solid product. The solid product is washed with an inert organic solvent, and brought into contact with (reacted with) a titanium halide in the presence of a hydrocarbon solvent to produce the solid catalyst component (I). In this case, the solid component and a titanium halide may be brought into contact with each other two or more times.

(3) A dialkoxymagnesium, and the component (a) are suspended in a hydrocarbon solvent, and brought into contact with (reacted with) a titanium halide to obtain a solid product. The solid product is washed with a hydrocarbon solvent, and brought into contact with a titanium halide in the presence of a hydrocarbon solvent to produce the solid catalyst component (I).

In order to further improve olefin polymerization activity and the stereoregularity of the resulting polymer, a titanium halide and a hydrocarbon solvent may be brought into contact with the solid catalyst component (I) (that has been washed) at 20 to 100° C., and the mixture may be heated to effect a reaction (secondary reaction), and washed with an inert organic solvent that is liquid at room temperature (23° C.) when implementing the methods (1) to (3). The above operation may be repeated 1 to 10 times.

The component (I) may suitably be produced using any of the methods (1) to (3). It is preferable to produce the solid catalyst component (I) by suspending a dialkoxymagnesium and the component (a) (or the component (b)) in a hydrocarbon solvent selected from a linear hydrocarbon, a branched aliphatic hydrocarbon, an alicyclic hydrocarbon, and an aromatic hydrocarbon, adding the suspension to a titanium halide to effect a reaction to obtain a solid product, washing the solid product with a hydrocarbon solvent, and bringing the component (b) (or the component (a)) into contact with the solid product in the presence of a hydrocarbon solvent.

It is also preferable to bring the solid catalyst component (I) obtained by the above method into contact with the organosilicon compound that includes a Si—O—C linkage, the organosilicon compound that includes a Si—N—C linkage, and/or the organoaluminum compound (optional), in order to improve the polymerization activity of the solid catalyst component, and improving the hydrogen response. The solid catalyst component (I) is brought into contact with these compounds in the presence of a hydrocarbon solvent. After bringing the solid catalyst component (I) into contact with each component, the mixture is sufficiently washed with a hydrocarbon solvent to remove unnecessary components. The solid catalyst component (I) may be repeatedly brought into contact with each compound. The components are brought into contact with each other at −10 to 100° C., preferably 0 to 90° C., and particularly preferably 20 to 80° C. The contact time is 1 minute to 10 hours, preferably 10 minutes to 5 hours, and particularly preferably 30 minutes to 2 hours. The components may be used in an arbitrary ratio as long as the advantageous effects of the ICP described herein are not adversely affected. The organosilicon compound that includes a Si—O—C linkage, or the organosilicon compound that includes a Si—N—C linkage are normally used in an amount of 0.2 to 20 mol, preferably 0.5 to 10 mol, and particularly preferably 1 to 5 mol, per mol of the titanium atoms included in the solid catalyst component (I). The organoaluminum compound is normally used in an amount of 0.5 to 50 mol, preferably 1 to 20 mol, and particularly preferably 1.5 to 10 mol, per mol of the titanium atoms included in the solid catalyst component (I).

It is preferable to remove the solvent from the resulting solid catalyst component (I) so that the weight ratio of the solvent relative to the solid component is 1/3 or less, and preferably 1/6 to 1/20, to obtain a powdery solid component.

The ratio of the components used when producing the solid catalyst component (I) is determined taking account of the production method. For example, the tetravalent titanium halide compound (b) is used in an amount of 0.5 to 100 mol, preferably 0.5 to 50 mol, and more preferably 1 to 10 mol, based on 1 mol of the magnesium compound (a). The solvent is used in an amount of 0.001 to 500 mol, preferably 0.001 to 100 mol, and more preferably 0.005 to 10 mol, based on 1 mol of the magnesium compound (a).

Propylene-Based Copolymerization Catalyst

A propylene-based ICP copolymerization catalyst (hereinafter may be referred to as "copolymerization catalyst") used as described herein includes (I) the solid catalyst component (see above), (II) an organoaluminum compound (hereinafter may be referred to as "component (e)" or "organoaluminum compound (e)"), and (III) an external electron donor compound (hereinafter may be referred to as "component (f)" or "external electron donor compound (f)"). Note that the component (f) may not be used when the solid catalyst component (I) includes the organosilicon compound that includes a Si—O—C linkage, the organosilicon compound that includes a Si—N—C linkage, or the organoaluminum compound (reagent). Specifically, the catalyst that includes the solid catalyst component and the organoaluminum compound exhibits excellent polymerization activity, and ensures excellent hydrogen response, even when the component (f) is not used.

The organoaluminum compound (II) is not particularly limited as long as the organoaluminum compound (II) is a compound represented by the general formula (3):

$$R^8_p AlQ_{3-p} \qquad (3)$$

wherein $R^8$ is an alkyl group having 1 to 6 carbon atoms; "q" is a hydrogen atom or halogen atom; and "p" is an integer from 0 to 3. Note that $R^8$ is preferably an ethyl group or an isobutyl group, "q" is preferably a hydrogen atom, a chlorine atom, or a bromine atom, and "p" is preferably 2, 2.5, or 3, and particularly preferably 3.

Specific examples of the organoaluminum compound include trialkylaluminums such as triethylaluminum, triisopropylaluminum, tri-n-butylaluminum, tri-n-hexylaluminum, and triisobutylaluminum, alkylaluminum halides such as diethylaluminum chloride and diethylaluminum bromide, diethylaluminum hydride, and the like. Among these, alkylaluminum halides such as diethylaluminum chloride, and trialkylaluminums such as triethylaluminum, tri-n-butylaluminum, and triisobutylaluminum are preferable, and triethylaluminum and triisobutylaluminum are particularly preferable. These organoaluminum compounds may be used either alone or in combination.

Examples of the external electron donor compound (III) used to produce the copolymerization catalyst used as described herein include an organic compound that includes an oxygen atom or a nitrogen atom. Examples of the organic compound that includes an oxygen atom or a nitrogen atom include an alcohol, a phenol, an ether, an ester, a ketone, an acid halide, an aldehyde, an amine, an amide, a nitrile, an isocyanate, and an organosilicon compound. The external electron donor compound (III) may be an organosilicon compound that includes a Si—O—C linkage, an aminosilane compound that includes a Si—N—C linkage, or the like.

Among these, an ester such as ethyl benzoate, ethyl p-methoxybenzoate, ethyl p-ethoxybenzoate, methyl p-toluate, ethyl p-toluate, methyl anisate, and ethyl anisate, a 1,3-diether, an organosilicon compound that includes a Si—O—C linkage, and an aminosilane compound that includes a Si—N—C linkage are preferable, and an organosilicon compound that includes a Si—O—C linkage, an aminosilane compound that includes a Si—N—C linkage, and a 2-substituted 1,3-diether are particularly preferable.

Examples of the organosilicon compound that includes a Si—O—C linkage that may be used as the external electron donor compound (III) include an organosilicon compound represented by the following general formula (4):

$$R^9_q Si(OR^{10})_{4-q}, \quad (4)$$

wherein $R^9$ is an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 15 carbon atoms, or a substituted aromatic hydrocarbon group, provided that a plurality of $R^4$ are either identical or different when a plurality of $R^9$ are present, $R^{10}$ is an alkyl group having 1 to 4 carbon atoms, a vinyl group, an alkenyl group having 3 to 12 carbon atoms, a cycloalkyl group having 3 to 6 carbon atoms, an aromatic hydrocarbon group having 6 to 12 carbon atoms, or a substituted aromatic hydrocarbon group having 7 to 12 carbon atoms, provided that a plurality of $R^{10}$ are either identical or different when a plurality of $R^{10}$ are present, and "q" is an integer from 0 to 3.

Examples of the aminosilane compound that includes a Si—N—C linkage that may be used as the external electron donor compound (III) include an aminosilane compound represented by the following general formula (5):

$$(R^{11}R^{12}N)_s SiR^{13}_{4-s} \quad (5)$$

wherein $R^1$ and $R^{12}$ are a hydrogen atom, an alkyl group having 1 to 20 carbon atoms, a vinyl group, an alkenyl group having 3 to 20 carbon atoms, a cycloalkyl group having 3 to 20 carbon atoms, a cycloalkenyl group having 3 to 20 carbon atoms, or an aryl group having 6 to 20 carbon atoms, provided that $R^{11}$ and $R^{12}$ are either identical or different, and optionally bond to each other to form a ring, $R^{13}$ is an alkyl group having 1 to 20 carbon atoms, a vinyl group, an alkenyl group having 3 to 12 carbon atoms, an alkoxy group having 1 to 20 carbon atoms, a vinyloxy group, an alkenyloxy group having 3 to 20 carbon atoms, a cycloalkyl group having 3 to 20 carbon atoms, a cycloalkyloxy group having 3 to 20 carbon atoms, an aryl group having 6 to 20 carbon atoms, or an aryloxy group having 6 to 20 carbon atoms, provided that a plurality of $R^{13}$ are either identical or different when a plurality of $R^{13}$ are present, and "s" is an integer from 1 to 3.

Examples of the organosilicon compound represented by the general formula (4) or (5) include phenylalkoxysilanes, alkylalkoxysilanes, phenylalkylalkoxysilanes, cycloalkylalkoxysilanes, alkyl(cycloalkyl)alkoxysilanes, (alkylamino)alkoxysilanes, alkyl(alkyl amino)alkoxysilanes, cycloalkyl(alkyl amino)alkoxysilanes, tetraalkoxysilanes, tetrakis(alkyl amino)silanes, alkyltris(alkylamino)silanes, dialkylbis(alkylamino)silanes, trialkyl(alkylamino)silanes, and the like. Specific examples of the organosilicon compound represented by the general formula (4) or (5) include n-propyltriethoxysilane, cyclopentyltriethoxysilane, phenyltrimethoxysilane, phenyltriethoxysilane, t-butyltrimethoxysilane, diisopropyldimethoxysilane, isopropylisobutyldimethoxysilane, diisopentyldimethoxysilane, bis(2-ethylhexyl)dimethoxysilane, t-butylmethyldimethoxysilane, t-butylethyldimethoxysilane, dicyclopentyldimethoxysilane, dicyclohexyldimethoxysilane, cyclohexylcyclopentyldimethoxysilane, cyclohexylmethyldimethoxysilane, tetraethoxysilane, tetrabutoxysilane, bis(ethyl amino)methylethylsilane, bis(ethylamino)-t-butylmethylsilane, bis(ethylamino)dicyclohexylsilane, dicyclopentylbis(ethylamino)silane, bis(methylamino)(methylcyclopentylamino)methylsilane, diethylaminotriethoxysilane, bis(cyclohexylamino)dimethoxysilane, bis(perhydroisoquinolino)dimethoxysilane, bis(perhydroquinolino)dimethoxysilane, ethyl(isoquinolino)dimethoxysilane, and the like. The external electron donor compound (III) may be one or more compounds selected from n-propyltriethoxysilane, phenyltrimethoxysilane, t-butylmethyldimetboxysilane, t-butylethyldimethoxysilane, diisopropyldimethoxysilane, isopropylisobutyldimethoxysilane, diisopentyldimethoxysilane, diphenyldimethoxysilane, dicyclopentyldimethoxysilane, cyclohexylmethyldimethoxysilane, tetramethoxysilane, tetraethoxysilane, t-butylmethylbis(ethylamino)silane, bis(ethylamino)dicyclohexylsilane, dicyclopentylbis(ethylamino)silane, bis(perhydroisoquinolino)dimethoxysilane, diethylaminotriethoxysilane, and the like.

Method for Copolymerizing Propylene and α-Olefin

In any embodiment, propylene and an α-olefin are copolymerized in the presence of the copolymerization catalyst to produce a propylene-based ICP. The α-olefin may be at least one olefin selected from an α-olefin having 2 to 20 carbon atoms (excluding propylene having 3 carbon atoms). Examples of the α-olefin include ethylene, I-butene, 1-pentene, 4-methyl-1-pentene, vinylcyclohexane, and the like. These α-olefins may be used either alone or in combination. Among these, ethylene and I-butene are preferable, and ethylene is particularly preferable.

Examples of the copolymerization method used in connection with ICP described herein a slurry polymerization method that utilizes an inert hydrocarbon solvent such as cyclohexane or heptane, a bulk polymerization method that utilizes a solvent such as liquefied propylene, and a vapor-phase polymerization method that substantially does not utilize a solvent. An ICP can be obtained by repeatedly implementing such a polymerization method in a plurality of steps. A combination of the bulk polymerization method and the vapor-phase polymerization method, or a multistep vapor-phase polymerization method is preferable as the copolymerization method.

It is preferable to homopolymerize propylene, or copolymerize propylene and a small amount of α-olefin (particularly ethylene) in the first step, and copolymerize propylene and an α-olefin (particularly ethylene), or copolymerize propylene, ethylene, and 1-butene in the second step. Note that the first step and the second step may respectively be performed a plurality of times.

It is preferable to effect polymerization in the first step while adjusting the polymerization temperature and the polymerization time so that 20 to 90 wt % of the propylene-based ICP is obtained. It is preferable to introduce propylene and ethylene or another α-olefin in the second step, and polymerize the components so that the ratio of the propylene-α-olefin part such as an ethylene-propylene rubber or an ethylene-propylene-1-butene ternary copolymer is 10 to 80 wt %.

The polymerization temperature in the first step and the second step is 200° C. or less, and preferably 100° C. or less. The polymerization pressure in the first step and the second step is 10 MPa or less, and preferably 5 MPa or less. The polymerization time in each step (the residence time when implementing continuous polymerization) is normally 1 minute to 5 hours. The copolymerization method used in connection with the methods described herein may be implemented using a continuous polymerization method or a batch polymerization method. Each of the first-step polymerization reaction and the second-step polymerization reaction may be implemented in a single step or a plurality of steps. When the first-step polymerization reaction or the second-step polymerization reaction is implemented in a plurality of steps, each step may be implemented under identical conditions or different conditions. It is preferable that the second-step polymerization reaction be a vapor-phase polymerization reaction since elution of EPR from polypropylene particles can be suppressed.

The catalyst components may be used for copolymerization in an arbitrary ratio as long as the advantageous effects described herein are not impaired. The organoaluminum compound (e) is normally used in an amount of 1 to 2000 mol, and preferably 50 to 1000 mol, per mol of the titanium atoms included in the solid catalyst component (I). The external electron donor compound (f) is normally used in an amount of 0.002 to 10 mol, preferably 0.01 to 2 mol, and particularly preferably 0.01 to 0.5 mol, per mol of the component (e). The components may be brought into contact with each other in an arbitrary order. It is desirable to add the organoaluminum compound (e) to the polymerization system, and bring the component (I) into contact with the organoaluminum compound (e).

When copolymerizing an olefin using the catalyst that includes the solid catalyst component, the organoaluminum compound, and the external electron donor compound (hereinafter may be referred to as "main polymerization"), it is desirable to effect preliminary polymerization prior to the main polymerization in order to further improve the catalytic activity, the stereoregularity, the particle properties of the resulting polymer, and the like. An olefin that is subjected to the main polymerization, or a monomer such as styrene, may be used for the preliminary polymerization.

The components and the monomer may be brought into contact with each other in an arbitrary order when effecting the preliminary polymerization. Note that it is preferable to add the component (e) to the preliminary polymerization system containing an inert gas atmosphere or an olefin gas atmosphere, bring the solid catalyst component (I) into contact with the component (e), and then bring the olefin (e.g., propylene), or a mixture of propylene and one or more additional olefins, into contact with the above mixture. When effecting the preliminary polymerization using the component (f), it is desirable to add the component (e) to the preliminary polymerization system containing an inert gas atmosphere or an olefin gas atmosphere, bring the component (f) into contact with the component (e), bring the solid catalyst component (I) into contact with the mixture, and then bring the olefin (e.g., propylene), or a mixture of propylene and one or more additional olefins, into contact with the above mixture.

A large amount of propylene-α-olefin can be incorporated in the resulting ICP under identical conditions by utilizing the production method described herein that utilizes the above catalyst, and the resulting ICP can be applied to a wide range of products. It is also possible to achieve high sustainability of polymerization of the propylene-α-olefin part, and control the properties of the propylene-α-olefin part through multistep polymerization.

In commercial operations the ICP's described herein are preferably produced in continuous series reactors wherein the polypropylene homopolymer is first produced in one or more slurry reactors, preferably in series, by contacting a catalyst and monomers, preferably propylene, such as in slurry-loop reactors well known in the art, followed by combining the same catalyst and formed homopolymer in a single gas-phase reactor with monomers, preferably propylene and ethylene and/or C4 to C10 α-olefins, to produce the propylene copolymer such that the copolymer imbeds itself in the homopolymer as discrete domains with the homopolymer as a matrix or "continuous" phase. The melt flow rate of the individual components can be controlled by, for example, addition and removal of hydrogen from the reactors. Most preferably, the homopolymer is produced in two loop-slurry reactors in series and each as a similar or same amount of hydrogen, producing homopolymer of nearly the same or the same MFR. The amount of hydrogen in the gas phase reactor may be the same or different from the loop slurry reactor, such level controlled by removing the hydrogen from the homopolymer stream entering the gas phase reactor or at some other stage. A suitable process and apparatus is described in the relevant portions of U.S. Pat. Nos. 9,000,106 and 8,076,419. The systems and processes disclosed therein can be used in a "balanced" reactor scheme where two or more slurry loop reactors in series forming the polypropylene homopolymer are under the same or similar conditions, followed by transfer of the crystalline polymer (polypropylene homopolymer) to a single gas phase reactor to form the semi-crystalline polymer (propylene copolymer).

In any embodiment, the two or more loop reactors can be operated in an "imbalanced" mode of operation, meaning that each reactor is operating under different conditions of temperature, pressure, and/or hydrogen concentration. Most preferably, the hydrogen concentrations in the two or more reactors is different, thus producing homopolypropylenes with distinct molecular weights, and thus, distinct melt flow rates. The level of hydrogen is controlled by means well known in the art, and can be reduced prior to entering the gas phase reactor if desired by mechanical and/or chemicals means.

Copolymer of Propylene and α-Olefin

A propylene-based ICP obtained using the method described herein is characterized in that polymers that differ in monomer composition are produced by multistep polymerization. Specifically, the main part of the propylene-based ICP has a structure in which two or more polymers that differ in monomer composition are present in each polymer particle in a mixed state (some of the polymers are linked through the polymer chain).

The propylene-based ICP obtained using the method described herein exhibits moderate rigidity due to the presence of crystalline polypropylene, or a crystalline polypropylene-based propylene-α-olefin copolymer that includes crystalline polypropylene and a small amount of α-olefin (e.g., ethylene), and exhibits excellent impact resistance due to the presence of a propylene-α-olefin copolymer (e.g., ethylene-propylene rubber) obtained by second-step polymerization. The balance between rigidity and impact resistance varies depending on the ratio of the homopolypropylene and the propylene-α-olefin copolymer (or EPR) portion. As used herein, "homopolypropylene" refers to a polymer comprising propylene-derived units and less than 0.5, or 0.4, or 0.3, or 0.2 wt % ethylene or other non-C3 α-olefin units by weight of the homopolypropylene. As used herein, "propylene-α-olefin copolymer" refers to a polymer comprising propylene-derived units and comprises within a range from 30 wt % to 50 wt % α-olefin derived units by weight of the propylene-α-olefin copolymer, preferably randomly.

The propylene-based ICP obtained by the method described herein includes the propylene-α-olefin copolymer in a low amount, but a relatively high amount of comonomer in the copolymer portion since the polymerization activity of the propylene-α-olefin part obtained by second-step polymerization is high. Since a large amount of α-olefin (e.g., ethylene) is introduced into the propylene-α-olefin copolymer, the copolymer exhibits relatively high rigidity with respect to the amount of propylene-α-olefin part and the ethylene content in the crystalline part. The copolymer exhibits high impact strength with respect to a polymer that includes an identical propylene-α-olefin part.

More particularly, described herein is a homopolypropylene having a melt flow rate (ASTM D1238 230° C., 2.16 kg) of at least 20, or 40, or 60 g/10 min, or within a range from 30, or 50, or 80 g/10 min to 160, or 180, or 200 g/10 min, an Mw/Mn within a range from 7, or 8, or 10 to 12, or 14, or 16, an Mz/Mw within a range from 7, or 8 to 12, or 14, or 16. In any embodiment, the homopolypropylene further comprises (or consists of, or consists essentially of) within a range from 2, or 4 wt % to 8, or 10, or 12, or 18, or 20, or 30 wt % of a propylene-α-olefin copolymer by weight of the composition, thus forming an ICP.

The propylene-α-olefin copolymer portion, preferably an ethylene-propylene rubber has many desirable features. In any embodiment the propylene-α-olefin copolymer comprises within a range from 30 wt % to 50 wt % α-olefin derived units by weight of the copolymer, and in any embodiment has an intrinsic viscosity within a range from 4 to 6, or 7, or 8 dL/g. In any embodiment the α-olefin derived units are selected from the group consisting of ethylene, and C4 to C8 α-olefin derived units, and combinations thereof. In any embodiment the crystalline portion of the propylene-α-olefin copolymer is 3, or 2.4, or 2, or 1.8, or 1.5, or 1.4 wt % or less relative to the total amount of propylene-α-olefin copolymer.

The homopolypropylene, alone or as part of the ICP, has many desirable features. In any embodiment the homopolypropylene has a weight average molecular weight (Mw) within a range from 150,000 g/mole to 400,000 g/mole. In any embodiment the homopolypropylene has a z-average molecular weight (Mz) of at least 1,100, or 1,400, or 1,600, or 2,000 kg/mole. In any embodiment the homopolypropylene has an Mz/Mn value within a range from 70, or 80, or 100 to 140, or 160. In any embodiment the homopolypropylene comprises at least first and second homopolypropylenes having MFR values different by at least 50, or 100 g/10 min. In any embodiment the homopolypropylene has a flexural modulus of at least 1800, or 1900, or 2000 MPa, preferably without a nucleating agent; preferably within a range from 1800, or 1900, or 2000 MPa to 2200, or 2400, or 2600 MPa.

In any embodiment the homopolypropylene, alone or as part of the ICP, comprises a first homopolypropylene having an MFR of less than 5, or 2, or 1, or 0.5 g/10 min, and a second homopolypropylene having an MFR of greater than 100, or 200, or 300 g/10 min Most preferably, the first homopolypropylene has an MFR within a range from 0.1 to 0.5, or 1, or 2, or 5 g/10 min. Most preferably, the second homopolypropylene has an MFR within a range from 100, or 200, or 300 g/10 min to 400, or 500, or 800, or 1000 g/10 min. This can be accomplished by, for example, using the catalyst described herein, and/or by using unbalanced reactors.

The ICP described herein has a number of desirable features. In any embodiment the ICP has a flexural modulus of at least 1500, or 1550, or 1600 MPa; preferably without a nucleating agent. In any embodiment the ICP has an Izod impact (23° C.) of at least 4, or 4.2, or 4.4 kJ/m².

In any embodiment the homopolypropylene and, when present, propylene-α-olefin copolymer is obtained by combining a Ziegler-Natta catalyst with propylene in two slurry polymerization reactors in series to produce the homopolypropylene, followed by combining the homopolypropylene and Ziegler-Natta catalyst with propylene and an α-olefin in a gas phase reactor to produce the propylene-α-olefin copolymer blended with the homopolypropylene. In any embodiment this process comprises combining a Ziegler-Natta catalyst having at least two different internal electron donors; most preferably phthalate and alkylidene malonate compounds. In any embodiment, the Ziegler-Natta catalyst comprises an dialkyl- and/or dialkoxymagnesium support having an average particle size within a range from 5, or 10, or 20 μm to 60, or 80, or 100, or 120 μm, and a sphericity of 3.0, or 2.0, or 1.5, or 1.3, or 1.25, or 1.2 or less.

The polypropylene or ICP described herein can be used in any number of applications such as automotive component or appliance components. For instance the inventive ICP's are useful in washing machine components, refrigerator components, electronic articles (e.g., stereos, radios, lap-top computers, desk-top computers, hand-held devices, etc.), mixing devices, and other tools and domestic wear. More particular uses of the ICP include washing machine lids, control panel, vacuum cleaner components, water dispenser panels, window air conditioning casing, and refrigerator door buckets and bins. The inventive ICP's are also suitable for applications such as interior trim automotive components in the neat form or as a compounding base to make thermoplastic olefin formulations used in the automotive industry such as instrument panel, bumper fascia, glove box bins, etc.

In a particular embodiment is an ICP with a MFR within a range from 60 g/10 min to 140 g/10 min consisting essentially of a homopolypropylene and within a range from 4 wt % to 10 wt % of an ethylene-propylene copolymer; wherein the homopolypropylene has a MFR within a range from 80 g/10 min to 200 g/10 min, an Mw/Mn within a range from 8 to 15, an Mz/Mw within a range from 7 to 16, and 1.1 wt % or less atactic polypropylene based on the total weight of the homopolypropylene and atactic polypropylene; and the EPR has within a range from 30 wt % to 50 wt % ethylene derived units by weight of the EPR, and an intrinsic viscosity within a range from 4 to 7 dL/g; and the polypropylene is obtained by combining a Ziegler-Natta catalyst with propylene in two slurry polymerization reactors in series to produce the homopolypropylene, followed by combining the homopolypropylene and Ziegler-Natta catalyst with propylene and ethylene in a gas phase reactor to produce the EPR blended with the homopolypropylene, where the Ziegler-Natta catalyst comprises two different internal electron donors.

The various descriptive elements and numerical ranges disclosed herein for the inventive polypropylene compositions and process to obtain them can be combined with other descriptive elements and numerical ranges to describe the invention(s); further, for a given element, any upper numerical limit can be combined with any lower numerical limit described herein, including the examples in jurisdictions that allow such combinations.

EXAMPLES

The invention is further described below by way of examples. Note that the following examples are for illustration purposes only, and the homopolypropylene or ICP described herein is not limited to the following examples. In the examples and comparative examples, the content of magnesium atoms, titanium atoms, halogen atoms, and the internal electron donor compound in the solid catalyst component were measured as described below. In the following examples, an ethylene-propylene random copolymer is the propylene-α-olefin.

Content of Magnesium Atoms in Solid Catalyst Component

The solid catalyst component from which the solvent component had been completely removed by heating (drying) under reduced pressure was weighed, and dissolved in a hydrochloric acid solution. After the addition of methyl orange (indicator) and a saturated ammonium chloride solution, the mixture was neutralized with aqueous ammonia, heated, cooled, and filtered to remove a precipitate (titanium hydroxide). A given amount of the filtrate was isolated preparatively, and heated. After the addition of a buffer and an EBT mixed indicator, magnesium atoms were titrated using an EDTA solution to determine the content of magnesium atoms in the solid catalyst component (EDTA titration method).

Content of Titanium Atoms in Solid Catalyst Component

The content of titanium atoms in the solid catalyst component was determined in accordance with the method (redox titration) specified in JIS M 8311-1997 ("Method for determination of titanium in titanium ores").

Content of Halogen Atoms in Solid Catalyst Component

The solid catalyst component from which the solvent component had been completely removed by heating (drying) under reduced pressure was weighed, and treated with a mixture of sulfuric acid and purified water to obtain an aqueous solution. A given amount of the aqueous solution was isolated preparatively, and halogen atoms were titrated with a silver nitrate standard solution using an automatic titration device ("COM-1500" manufactured by Hiranuma Sangyo Co., Ltd.) to determine the content of halogen atoms in the solid catalyst component (silver nitrate titration method).

Content of Internal Electron Donor Compound in Solid Catalyst Component

The content of the internal electron donor compound (first internal electron donor compound, second internal electron donor compound, and third internal electron donor compound) in the solid catalyst component was determined using a gas chromatograph ("GC-14B" manufactured by Shimadzu Corporation) under the following conditions. The number of moles of each component (each internal electron donor compound) was calculated from the gas chromatography measurement results using a calibration curve that was drawn in advance using the measurement results at a known concentration. Measurement conditions are as follows:

Column: packed column (2.6 (diameter)×2.1 m, Silicone SE-30 10%, Chromosorb™ WAW DMCS 80/100, manufactured by GL Sciences Ltd.)

Detector: flame ionization detector (FID)

Carrier gas: helium, flow rate: 40 ml/min

Measurement temperature: vaporization chamber: 280° C., column: 225° C., detector: 280° C., or vaporization chamber: 265° C., column: 180° C., detector: 265° C.

Example 1

Synthesis of Solid Catalyst Component (A1)

(1) First Step

A 500 ml round bottom flask equipped with a stirrer in which the internal atmosphere had been sufficiently replaced by nitrogen gas, was charged with 40 ml (364 mmol) of titanium tetrachloride and 60 ml (565 mmol) of toluene to prepare a solution.

A suspension prepared using 20 g (175 mmol) of spherical diethoxymagnesium (diameter=43 μm), 80 ml (753 mmol) of toluene, and 4.0 ml (17.3 mmol) of di-n-propyl phthalate was added to the solution. The mixture was stirred at −5° C. for 1 hour, and heated to 110° C. 4.0 ml (17.2 mmol) of diethyl benzylidenemalonate was added stepwise to the mixture while heating the mixture. After reacting the mixture at 90° C. for 3 hours with stirring, the reaction mixture was allowed to stand, and the supernatant liquid was removed to obtain reaction product slurry.

After the addition of 187 ml of toluene (100° C.) to the reaction product slurry, the mixture was stirred and allowed to stand, and the supernatant liquid was removed. This operation was repeated four times to wash the reaction product to obtain reaction product slurry including a solid component (I).

(2) Second Step 170 ml of toluene and 30 ml (273 mmol) of titanium tetrachloride were added to the reaction product slurry including the solid component (I). The mixture was heated to 110° C., and reacted for 2 hours with stirring. After completion of the reaction, the supernatant liquid was removed. After the addition of 180 ml of toluene and 20 ml (182 mmol) of titanium tetrachloride, the mixture was heated to 80° C. After the addition of 0.5 ml (2.2 mmol) of di-n-propyl phthalate, the mixture was heated to 110° C., and reacted for 2 hours with stirring. The resulting reaction mixture was allowed to stand, and the supernatant liquid was removed to obtain reaction product slurry.

After completion of the reaction, 187 ml of toluene (100° C.) was added to the reaction product slurry, the mixture was stirred and allowed to stand, and the supernatant liquid was removed. This operation was repeated twice to wash the reaction product to obtain reaction product slurry including a solid component (II).

(3) Third Step

An amount of 170 ml (1600 mmol) of toluene was added to the reaction product slurry including the solid component (II) to adjust the concentration of titanium tetrachloride in the reaction mixture to 0.2 wt %, and the mixture was heated to 80° C. After the addition of 0.5 ml (2.2 mmol) of di-n-propyl phthalate, the mixture was reacted at 100° C. for 1 hour with stirring. The resulting reaction mixture was allowed to stand, and the supernatant liquid was removed to obtain reaction product slurry.

After the addition of 150 ml of n-heptane (60° C.) to the reaction product slurry, the mixture was stirred and allowed to stand, and the supernatant liquid was removed. This operation was repeated 7 times to wash the reaction product to obtain a solid catalyst component (A1) for olefin polymerization.

The solid catalyst component (A1) had a titanium atom content of 1.7 wt %, a total phthalic diester content of 14.6 wt %, and diethyl benzylidenemalonate content of 2.9 wt %.

Preparation of Propylene Polymerization Catalyst and Polymerization of Propylene An autoclave (internal volume: 2.0 l) equipped with a stirrer in which the internal atmosphere had been completely replaced by nitrogen gas, was charged with 1.3 mmol of triethylaluminum, 0.22 mmol of diethylaminotriethoxysilane, and the solid catalyst component (A1) (2.6 μmol on a titanium atom basis) to prepare a propylene polymerization catalyst (B1).

The autoclave was charged with the propylene polymerization catalyst, and further charged with liquefied propylene (17 mol). The liquefied propylene was subjected to preliminary polymerization at 20° C. for 5 minutes under a pressure of 1.1 MPa, heated, and polymerized at 70° C. for 15 minutes under 3.2 MPa. Followed by addition of 5.5 L of hydrogen gas, the liquefied propylene was polymerized at 70° C. for 45 minutes under 3.2 MPa to obtain a polypropylene.

The propylene polymerization activity per gram of the solid catalyst component, the melt flow rate (MFR) of the polymer, and the p-xylene-soluble content (XS) in the polymer were measured as described below. The results are shown in Table 1.

Propylene Polymerization Activity

The propylene polymerization activity per gram of solid catalyst component was calculated using the following expression: Propylene polymerization activity (g-PP/g-catalyst)=mass (g) of polypropylene/mass (g) of solid catalyst component included in olefin polymerization catalyst.

Melt Flow Rate (MFR) of Polymer

The melt flow rate (MFR) (melt flow index) (g/10 min) of the homopolypropylene and ICP was measured in accordance with ASTM D1238 (JIS K 7210), using 2.16 kg at 230° C.

Xylene-Soluble Content (XS) in Polymer

A flask equipped with a stirrer was charged with 4.0 g of the polymer (polypropylene) and 200 ml of p-xylene. The external temperature was increased to be equal to the boiling point (about 150° C.) of xylene, and the polymer was dissolved over 2 hours while maintaining p-xylene contained in the flask at a temperature (137 to 138° C.) under the condition of boiling point. The solution was cooled to 23° C. over 1 hour, and an insoluble component and a soluble component was separated by filtration. A solution of the soluble component was collected, and p-xylene was evaporated by heating (drying) under reduced pressure. The weight of the residue was calculated, and the relative ratio (wt %) with respect to the polymer (polypropylene) was calculated to determine the xylene-soluble content (XS).

Evaluation of Flexural Modulus (FM)

The polymer (polypropylene) was injection-molded to prepare a property measurement specimen. The specimen was conditioned in a temperature-controlled room maintained at 23° C. for 144 hours or more, and in accordance with JIS K 7171, the flexural modulus (FM) (MPa) was measured using the specimen provided that a liquid/powder exudate was not observed on the surface thereof. Note that the property measurement specimen was prepared as described below. 0.10 wt % of Irganox™ 1010 (manufactured by BASF), and 0.10 wt % of Irgafos™ 168 (manufactured by BASF), and 0.08 wt % of calcium stearate were added to the polymer, and the mixture was kneaded and granulated using a single-screw extruder to obtain pellets of the polymer. The pellets of the polymer (polypropylene) were introduced into an injection molding machine (mold temperature: 60° C., cylinder temperature: 230° C.), and injection-molded to prepare the property measurement specimen.

Molecular Weight and Molecular Weight Distribution of Polymer

The molecular weight and molecular weight distribution (Mw/Mn) of the polymer were measured by gel permeation chromatography (GPC) (GPCHLC-8321 GPC/HT manufactured by Toso) under the following conditions. The molecular weight distribution of the polymer was evaluated by the ratio "Mw/Mn" of the weight average molecular weight (Mw) to the number average molecular weight (Mn). Other conditions are as follows:

Solvent: o-dichlorobenzene (ODCB)+BHT0.1%
Temperature: 140° C. (SEC)
Column: GMHHR-H(20)×1 and GMHHR-H(S)HT2×1
Sample concentration: 0.5 mg/ml(ODCB)
Sample amount: 0.5 ml
Carrier solvent flow rate: 1.0 ml/min Example 2

Synthesis of Solid Catalyst Component (A2)

A solid catalyst component (A2) was prepared in the same manner as example 1, except that 0.6 ml (2.2 mmol) of di-n-butyl benzylidenemalonate was added to the flask instead of di-n-propyl phthalate at second step and third step. The solid catalyst component (A2) had a titanium atom content of 1.8 wt %, a total phthalic diester content of 14.0 wt %, and di-n-butyl benzylidenemalonate content of 2.8 wt %.

Preparation of Propylene Polymerization Catalyst and Polymerization of Propylene A polymerization catalyst (B2) was prepared and evaluated in the same manner as example 1, except that the solid catalyst component (A2) was used instead of the solid catalyst (A1). The polymerization results are shown in Table 1.

Example 3

Synthesis of Solid Catalyst Component (A3)

A solid catalyst component (A3) was prepared in the same manner as example 1, except that 0.5 ml (2.2 mmol) of diethyl benzylidenemalonate was added to the flask instead of di-n-propyl phthalate at second step and third step. The solid catalyst component (A3) had a titanium atom content of 1.7 wt %, a total phthalic diester content of 18.5 wt %, and diethyl benzylidenemalonate content of 8.0 wt %.

Preparation of Propylene Polymerization Catalyst and Polymerization of Propylene A polymerization catalyst (B3) was prepared and evaluated in the same manner as example 1, except that the solid catalyst component (A3) was used instead of the solid catalyst (A1). The polymerization results are shown in Table 1.

Example 4

Synthesis of Solid Catalyst Component (A4)

A solid catalyst component (A4) was prepared in the same manner as example 1, except that 4.4 ml (17.2 mmol) of di-n-propyl benzylidenemalonate was added stepwise to the mixture while heating the mixture instead of di-n-ethyl benzylidenemalonate at first step of heating procedure. The solid catalyst component (A4) had a titanium atom content of 1.7 wt %, a total phthalic diester content of 15.3 wt %, and di-n-propyl benzylidenemalonate content of 2.2 wt %.

Preparation of Propylene Polymerization Catalyst and Polymerization of Propylene A polymerization catalyst (B4) was prepared and evaluated in the same manner as example 1, except that the solid catalyst component (A4) was used instead of the solid catalyst (A1). The polymerization results are shown in Table 1.

Example 5

Synthesis of Solid Catalyst Component (A5)

(1) First Step

A 75 liter round bottom reactor equipped with a stirrer in which the internal atmosphere had been sufficiently replaced by nitrogen gas, was charged with 6.6 L (60 mol) of titanium tetrachloride and 13.2 L (12.4 mol) of toluene to prepare a solution.

A suspension prepared using 3.3 kg (28.9 mol) of spherical diethoxymagnesium (diameter=43 µm), 13.2 L (12.4 mol) of toluene, and 660 ml (2.9 mol) of di-n-propyl phthalate was added to the solution. The mixture was stirred at −5° C. for 1 hour, and heated to 110° C. 660 ml (2.9 mol) of diethyl benzylidenemalonate was added stepwise to the mixture while heating the mixture. After reacting the mixture at 90° C. for 3 hours with stirring, the reaction mixture was allowed to stand, and the supernatant liquid was removed to obtain reaction product slurry.

After the addition of 30.9 L of toluene (100° C.) to the reaction product slurry, the mixture was stirred and allowed to stand, and the supernatant liquid was removed. This operation was repeated four times to wash the reaction product to obtain reaction product slurry including a solid component (I).

(2) Second Step 28.1 L of toluene and 5.0 L (46 mol) of titanium tetrachloride were added to the reaction product slurry including the solid component (I). The mixture was heated to 110° C., and reacted for 2 hours with stirring. After completion of the reaction, the supernatant liquid was removed. After the addition of 29.7 L of toluene and 3.3 L (30 mol) of titanium tetrachloride, the mixture was heated to 80° C. After the addition of 83 ml (365 mmol) of di-n-propyl phthalate, the mixture was heated to 110° C., and reacted for 1 hour with stirring. The resulting reaction mixture was allowed to stand, and the supernatant liquid was removed to obtain reaction product slurry.

After completion of the reaction, 30.9 L of toluene (100° C.) was added to the reaction product slurry, the mixture was stirred and allowed to stand, and the supernatant liquid was removed. This operation was repeated twice to wash the reaction product to obtain reaction product slurry including a solid component (II).

(3) Third Step

An amount of 30.9 L (290 mol) of toluene was added to the reaction product slurry including the solid component (II) to adjust the concentration of titanium tetrachloride in the reaction mixture to 0.2 wt %, and the mixture was heated to 80° C. After the addition of 83 ml (365 mmol) of di-n-propyl phthalate, the mixture was reacted at 100° C. for 1 hour with stirring. The resulting reaction mixture was allowed to stand, and the supernatant liquid was removed to obtain reaction product slurry.

After the addition of 24.9 L of n-heptane (60° C.) to the reaction product slurry, the mixture was stirred and allowed to stand, and the supernatant liquid was removed. This operation was repeated 7 times to wash the reaction product to obtain a solid catalyst component (A5) for olefin polymerization.

The solid catalyst component (A5) had a titanium atom content of 1.5 wt %, a total phthalic diester content of 14.5 wt %, and diethyl benzylidenemalonate content of 2.2 wt %.

Preparation of Propylene Polymerization Catalyst and Polymerization of Propylene A polymerization catalyst (B5) was prepared and evaluated in the same manner as example 1, except that the solid catalyst component (A5) was used instead of the solid catalyst (A1). The polymerization results are shown in Table 1.

Preparation of Ethylene-Propylene Copolymerization Catalyst and Production of Impact Copolymer An autoclave (internal volume: 2.0 L) equipped with a stirrer in which the internal atmosphere had been completely replaced by nitrogen gas, was charged with 2.2 mmol of triethylaluminum, 0.22 mmol of diethylaminotriethoxysilane, and the solid catalyst component (A1) (0.37 µmol on a titanium atom basis) to prepare an ethylene-propylene copolymerization catalyst.

An autoclave equipped with a stirrer was charged with the ethylene-propylene copolymerization catalyst, and further charged with liquefied propylene (15 mol) and hydrogen gas (partial pressure: 0.20 MPa). The liquefied propylene was subjected to preliminary polymerization at 20° C. for 5 minutes, and subjected to first-step homopropylene polymerization (homopolymerization) at 70° C. for 60 minutes. The pressure inside the autoclave was then returned to normal pressure.

Before starting copolymerization step, 0.70 MPa of propylene, 0.49 MPa of ethylene, and 0.010 MPa of hydrogen were added to the autoclave. The mixture was heated to 70° C., and reacted at 70° C. for 15 minutes under a pressure of 1.2 MPa while feeding ethylene, propylene, and hydrogen in a ratio of 1.6/2.4/0.015 (L/min) to obtain an ethylene-propylene copolymer. The polymerization results are shown in Table 2.

The propylene-based block copolymerization activity (ICP (impact copolymer) activity) (g-ICP/(g-cat)) was measured as described below to evaluate the sustainability of polymerization activity. The MFR of the homopolymer, the MFR of the ICP, the EPR content (propylene-α-olefin content) (wt %) in the propylene-based block copolymer, the ethylene content (wt %) in the EPR, the ethylene content (wt %) in the xylene-insoluble component, the flexural modulus (FM) (MPa), and the Izod impact strength (KJ/m$^2$) were also measured. The results are shown in Table 2.

ICP Polymerization Activity

The propylene-based block copolymerization activity per gram of the solid catalyst component was calculated by the following expression: Propylene-based block copolymerization activity (g-1CP/g-catalyst)=(I (g)−F (g)+J (g))÷[{mass (g) of solid catalyst component in olefin polymerization catalyst×((G (g)−F (g)−J (g))}÷(G (g)−F (g)))]. Note that "I" is the mass (g) of the autoclave after completion of copolymerization, "F" is the mass (g) of the autoclave, "G" is the mass (g) of the autoclave after unreacted monomers had been removed after completion of propylene homopolymerization, and "J" is the amount (g) of polymer removed after homopolymerization.

Homopolymerization Activity

The homopolymerization activity per gram of solid catalyst component was calculated by the following expression: homopolymerization activity(g-PP/g-catalyst)=(G (g))−F (g))÷(mass (g) of solid catalyst component in olefin polymerization catalyst). The variables have the same meaning as above.

EPR Content (Xylene-Soluble Content in ICP Polymer)

A flask equipped with a stirrer was charged with 5.0 g of the copolymer (ICP propylene polymer) and 250 ml of p-xylene. The external temperature was increased to be equal to or higher than the boiling point of xylene (about 150° C.), and the polymer was dissolved over 2 hours while maintaining p-xylene contained in the flask at the boiling point (137 to 138° C.). The solution was cooled to 23° C.

over 1 hour, and an insoluble component and a soluble component were separated by filtration. A solution of the soluble component was collected, and p-xylene was evaporated by heating (drying) under reduced pressure. The weight of the residue was calculated, and the relative ratio (wt %) relative to the polymer (propylene-based block copolymer) was calculated to determine the EPR content.

Determination of Ethylene Content in EPR

A small amount of EPR (xylene-soluble component) that was extracted with xylene when determining the EPR content (xylene-soluble content in the ICP polymer) was sampled, and hot-pressed in the shape of a film. The ethylene content in the EPR was calculated from the absorbance measured using a Fourier transform infrared spectrometer (FT-IR) ("Avatar" manufactured by Thermo Nicolet) based on a calibration curve drawn using a plurality of samples having a known ethylene content. Other parameters are as follows:

Measurement wavelength: 720 cm$^{-1}$ and 1150 cm$^{-1}$

Film thickness: 0.1 to 0.2 mm

Ethylene Content in Xylene-Insoluble (XI) Component

A small amount of the xylene-insoluble component obtained by extraction with xylene was sampled, and hot-pressed in the shape of a film, and the ethylene content in the xylene-insoluble component was calculated in the same manner as the ethylene content in the EPR.

The Intrinsic Viscosity of EPR (IV-EPR)

The intrinsic viscosity of EPR (IV-EPR) was calculated by using following formula (Huggins equation) from the reduced viscosity (ηSP/c) measured in decalin at 135° C. by means of Ubbelohde-type viscometer:

$$\eta SP/c = [\eta] + K[\eta]^2 c$$

wherein, ηSP/c (dL/g) is reduced viscosity, [η] (dL/g) is intrinsic viscosity, "c" (g/dL) is polymer concentration, and "K" is 0.35 (Huggins constant).

Izod Impact Strength

An amount of 0.10 wt % of Irganox™ 1010 (manufactured by BASF), and 0.10 wt % of Irgafos™ 168 (manufactured by BASF) were added to the ethylene-propylene copolymer, and the mixture was kneaded and granulated using a single-screw extruder to obtain pellets of the ethylene-propylene copolymer. The pellets of the ethylene-propylene copolymer were introduced into an injection molding machine (mold temperature: 60° C., cylinder temperature: 230° C.), and injection-molded to prepare a property measurement specimen. The specimen was conditioned in a temperature-controlled room maintained at 23° C. for 144 hours or more, and the Izod impact strength of the specimen was measured in accordance with JIS K 7110 ("Method of Izod Impact Test For Rigid Plastics") using an Izod tester (Model A-121804405 manufactured by Toyo Seiki Seisaku-Sho, Ltd.). Other conditions are as follows:

Shape of specimen: ISO 180/4A, thickness: 3.2 mm, width: 12.7 mm, length: 63.5 mm Shape of notch: type-A notch (radius: 0.25 mm) formed using a die provided with a notch Temperature: 23° C. and −30° C.

Impact speed: 3.5 m/s

Nominal pendulum energy: 0.5 J (23° C.) and 0.5 J (−30° C.)

Example 6

Preparation of Propylene Polymerization Catalyst and Polymerization of Propylene A polymerization catalyst (B6) was prepared and evaluated in the same manner as example 5, except that 0.22 mmol of diisopropyldimethoxysilane was used instead of 0.22 mmol of diethylaminotriethoxysilane and 7.0 L of hydrogen was added instead of 5.5 L of hydrogen. The polymerization results are shown in Table 1.

Example 7

Preparation of Propylene Polymerization Catalyst and Polymerization of Propylene A polymerization catalyst (B5) was prepared and evaluated in the same manner as example 5, except that polymerization was performed under 65° C. instead of 70° C. and 9.0 L of hydrogen was added instead of 5.5 L of hydrogen. The polymerization results are shown in Table 1.

Example 8

Evaluation of Flexural Modulus (FM)

With the same polymer obtained in the example 7, flexural modulus evaluation was performed in the same manner as example 1, except that 1,000 ppm of sodium benzoate was added as a nucleating agent instead of 800 ppm of calcium stearate before the extrusion process of the polymer. The results are shown in Table 1.

Comparative Example 1

Synthesis of Solid Catalyst Component (a1)

(1) First Step

A 500 ml round bottom flask equipped with a stirrer in which the internal atmosphere had been sufficiently replaced by nitrogen gas, was charged with 40 ml (364 mmol) of titanium tetrachloride and 60 ml (565 mmol) of toluene to prepare a solution.

A suspension prepared using 20 g (175 mmol) of spherical diethoxymagnesium (diameter=43 μm), 80 ml (753 mmol) of toluene, and 4.0 ml (17.3 mmol) of di-n-propyl phthalate was added to the solution. The mixture was stirred at −5° C. for 1 hour, and heated to 110° C. 4.0 ml (17.2 mmol) of di-n-propyl phthalate was added stepwise to the mixture while heating the mixture. After reacting the mixture at 90° C. for 3 hours with stirring, the reaction mixture was allowed to stand, and the supernatant liquid was removed to obtain reaction product slurry.

After the addition of 187 ml of toluene (100° C.) to the reaction product slurry, the mixture was stirred and allowed to stand, and the supernatant liquid was removed. This operation was repeated four times to wash the reaction product to obtain reaction product slurry including a solid component (I).

(2) Second Step 170 ml of toluene and 30 ml (273 mmol) of titanium tetrachloride were added to the reaction product slurry including the solid component (I). The mixture was heated to 110° C., and reacted for 2 hours with stirring. After completion of the reaction, the supernatant liquid was removed. After the addition of 180 ml of toluene and 20 ml (182 mmol) of titanium tetrachloride, the mixture was heated to 80° C. After the addition of 0.5 ml (2.2 mmol) of diethyl benzylidenemalonate, the mixture was heated to 110° C., and reacted for 2 hours with stirring. The resulting reaction mixture was allowed to stand, and the supernatant liquid was removed to obtain reaction product slurry.

After completion of the reaction, 187 ml of toluene (100° C.) was added to the reaction product slurry, the mixture was stirred and allowed to stand, and the supernatant liquid was removed. This operation was repeated twice to wash the reaction product to obtain reaction product slurry including a solid component (II).

(3) Third Step

An amount of 170 ml (1600 mmol) of toluene was added to the reaction product slurry including the solid component (II) to adjust the concentration of titanium tetrachloride in the reaction mixture to 0.2 wt %, and the mixture was heated to 80° C. After the addition of 0.5 ml (2.2 mmol) of diethyl benzylidenemalonate, the mixture was reacted at 100° C. for 1 hour with stirring. The resulting reaction mixture was allowed to stand, and the supernatant liquid was removed to obtain reaction product slurry.

After the addition of 150 ml of n-heptane (60° C.) to the reaction product slurry, the mixture was stirred and allowed to stand, and the supernatant liquid was removed. This operation was repeated 7 times to wash the reaction product to obtain a solid catalyst component (a1) for olefin polymerization. The solid catalyst component (a1) had a titanium atom content of 1.7 wt %, a total phthalic diester content of 15.4 wt %, and diethyl benzylidenemalonate content of 4.0 wt %.

Preparation of Propylene Polymerization Catalyst and Polymerization of Propylene A polymerization catalyst (b1) was prepared and evaluated in the same manner as example 1, except that the solid catalyst component (a1) was used instead of the solid catalyst (A1). The polymerization results are shown in Table 1.

Comparative Example 2

Synthesis of Solid Catalyst Component (a2)

A 500 ml round bottom flask equipped with a stirrer in which the internal atmosphere had been sufficiently replaced by nitrogen gas, was charged with 20 g of diethoxymagnesium (diameter=43 μm), 110 mL of toluene, 40 ml of titanium tetrachloride. The mixture was heated to 60° C. After the addition of 8.2 ml (30.6 mmol) of diethyl diisopropylsuccinate, the mixture was heated to 100° C., and reacted for 2 hours with stirring. The resulting reaction mixture was allowed to stand, and the supernatant liquid was removed to obtain reaction product slurry.

After completion of the reaction, 90 ml of toluene (100° C.) was added to the reaction product slurry, the mixture was stirred and allowed to stand, and the supernatant liquid was removed. This operation was repeated 6 times to wash the reaction product to obtain reaction product slurry including a solid component.

An amount of 100 ml of toluene and 20 ml of titanium tetrachloride were added to the reaction product slurry including the solid component. The mixture was heated to 100° C., and reacted for 15 minutes with stirring. After completion of the reaction, the supernatant liquid was removed. This operation was repeated 3 times followed by the addition of 150 ml of n-heptane (40° C.) to the reaction product slurry, the mixture was stirred and allowed to stand, and the supernatant liquid was removed. This operation was repeated 6 times to wash the reaction product to obtain a solid catalyst component (a2) for olefin polymerization. The solid catalyst component (a2) had a titanium atom content of 2.2 wt %, and a diethyl diisopropylsuccinate content of 21.3 wt %.

Preparation of Propylene Polymerization Catalyst and Polymerization of Propylene A polymerization catalyst (b2) was prepared and evaluated in the same manner as example 1, except that the solid catalyst component (a2) was used instead of the solid catalyst (A1). The polymerization results are shown in Table 1.

Comparative Example 3

Synthesis of Solid Catalyst Component (a3)

(1) First Step

A 75 liter round bottom reactor equipped with a stirrer in which the internal atmosphere had been sufficiently replaced by nitrogen gas, was charged with 6.6 L (60 mol) of titanium tetrachloride and 13.2 L (12.4 mol) of toluene to prepare a solution.

A suspension prepared using 3.3 kg (28.9 mol) of spherical diethoxymagnesium (diameter=61 μm), 13.2 L (12.4 mol) of toluene, and 930 ml (4 mol) of di-n-propyl phthalate was added to the solution. The mixture was stirred at −5° C. for 1 hour, and heated to 110° C. 138 ml (480 mmol) of dimethyl di-isobutylmalonate was added stepwise to the mixture while heating the mixture. After reacting the mixture at 110° C. for 3 hours with stirring, the reaction mixture was allowed to stand, and the supernatant liquid was removed to obtain reaction product slurry.

After the addition of 30.9 L of toluene (100° C.) to the reaction product slurry, the mixture was stirred and allowed to stand, and the supernatant liquid was removed. This operation was repeated four times to wash the reaction product to obtain reaction product slurry including a solid component (I).

(2) Second Step

An amount of 28.1 L of toluene and 5.0 L (46 mol) of titanium tetrachloride were added to the reaction product slurry including the solid component (I). The mixture was heated to 110° C., and reacted for 2 hours with stirring. After completion of the reaction, the supernatant liquid was removed. After the addition of 29.7 L of toluene and 3.3 L (30 mol) of titanium tetrachloride, the mixture was heated to 80° C. After the addition of 83 ml (365 mmol) of di-n-propyl phthalate, the mixture was heated to 110° C., and reacted for 1 hour with stirring. The resulting reaction mixture was allowed to stand, and the supernatant liquid was removed to obtain reaction product slurry.

After completion of the reaction, 30.9 L of toluene (100° C.) was added to the reaction product slurry, the mixture was stirred and allowed to stand, and the supernatant liquid was removed. This operation was repeated twice to wash the reaction product to obtain reaction product slurry including a solid component (II).

(3) Third Step

An amount of 30.9 L (290 mol) of toluene was added to the reaction product slurry including the solid component (II) to adjust the concentration of titanium tetrachloride in the reaction mixture to 0.2 wt %, and the mixture was heated to 80° C. After the addition of 83 ml (365 mmol) of di-n-propyl phthalate, the mixture was reacted at 100° C. for 1 hour with stirring. The resulting reaction mixture was allowed to stand, and the supernatant liquid was removed to obtain reaction product slurry.

After the addition of 24.9 L of n-heptane (60° C.) to the reaction product slurry, the mixture was stirred and allowed to stand, and the supernatant liquid was removed. This operation was repeated 7 times to wash the reaction product to obtain a solid catalyst component (a3) for olefin polymerization. The solid catalyst component (a3) had a titanium atom content of 1.9 wt %, a total phthalic diester content of 18.7 wt %, and dimethyl diisobutylmalonate content of 1.2 wt %.

Preparation of Propylene Polymerization Catalyst and Polymerization of Propylene A polymerization catalyst (b3) was prepared and evaluated in the same manner as example 1, except that the solid catalyst component (a3) was used instead of the solid catalyst (A1). The polymerization results are shown in Table 1.

Comparative Example 4

Synthesis of Solid Catalyst Component (a4)
(1) First Step

A 75 liter round bottom reactor equipped with a stirrer in which the internal atmosphere had been sufficiently replaced by nitrogen gas, was charged with 6.6 L (60 mol) of titanium tetrachloride and 13.2 L (12.4 mol) of toluene to prepare a solution.

A suspension prepared using 3.3 kg (28.9 mol) of spherical diethoxymagnesium (diameter=43 μm), 13.2 L (12.4 mol) of toluene, and 660 ml (2.9 mol) of di-n-butylphthalate was added to the solution. The mixture was stirred at −5° C. for 1 hour, and heated to 110° C. 660 ml (2.9 mol) of di-n-butylphthalate was added stepwise to the mixture while heating the mixture. After reacting the mixture at 90° C. for 3 hours with stirring, the reaction mixture was allowed to stand, and the supernatant liquid was removed to obtain reaction product slurry.

After the addition of 30.9 L of toluene (100° C.) to the reaction product slurry, the mixture was stirred and allowed to stand, and the supernatant liquid was removed. This operation was repeated four times to wash the reaction product to obtain reaction product slurry including a solid component (I).

(2) Second Step

An amount of 28.1 L of toluene and 5.0 L (46 mol) of titanium tetrachloride were added to the reaction product slurry including the solid component (I). The mixture was heated to 110° C., and reacted for 2 hours with stirring. After completion of the reaction, the supernatant liquid was removed.

After the addition of 24.9 L of n-heptane (60° C.) to the reaction product slurry, the mixture was stirred and allowed to stand, and the supernatant liquid was removed. This operation was repeated 7 times to wash the reaction product to obtain a solid catalyst component (a4) for olefin polymerization. The solid catalyst component (a4) had a titanium atom content of 2.8 wt % and a total phthalic diester content of 17.3 wt %.

Preparation of Propylene Polymerization Catalyst and Polymerization of Propylene A polymerization catalyst (b4) was prepared and evaluated in the same manner as example 1, except that the solid catalyst component (a4) was used instead of the solid catalyst (A1). The polymerization results are shown in Table 1.

Preparation of Ethylene Propylene Copolymerization Catalyst and Production of Impact Copolymer A polymerization catalyst (b4) was prepared and evaluated in the same manner as example 1, except that the solid catalyst component (a4) was used instead of the solid catalyst (A1). The polymerization results are shown in Table 2.

Inventive Impact Copolymer Example 9

An autoclave (internal volume: 2.0 L) equipped with a stirrer in which the internal atmosphere had been completely replaced by nitrogen gas, was charged with 2.2 mmol of triethylaluminum, 0.22 mmol of diethylaminotriethoxysilane, and the solid catalyst component (A1) (0.37 μmol on a titanium atom basis) to prepare an ethylene-propylene copolymerization catalyst.

An autoclave equipped with a stirrer was charged with the ethylene-propylene copolymerization catalyst, and further charged with liquefied propylene (15 mol) and hydrogen gas (partial pressure: 0.20 MPa). The liquefied propylene was subjected to preliminary polymerization at 20° C. for 5 minutes, and subjected to first-step homopolypropylene polymerization (homopolymerization) at 70° C. for 60 minutes. The pressure inside the autoclave was then returned to normal pressure.

Before starting copolymerization step, 0.70 MPa of propylene, 0.49 MPa of ethylene, and 0.010 MPa of hydrogen were added to the autoclave. The mixture was heated to 70° C., and reacted at 70° C. for 15 minutes under a pressure of 1.2 MPa while feeding ethylene, propylene, and hydrogen in a ratio of 1.6/2.4/0.015 (L/min) to obtain an ethylene-propylene copolymer. The polymerization results are shown in Table 3.

Comparative Impact Copolymer Example 5

A polymerization catalyst (b4) was prepared and evaluated in the same manner as example 1, except that the solid catalyst component (a4) was used instead of the solid catalyst (A1). The polymerization results are shown in Table 1.

A polymerization catalyst (b4) was prepared and evaluated in the same manner as example 1, except that the solid catalyst component (a4) was used instead of the solid catalyst (A1). The polymerization results are shown in Table 3.

TABLE 1

| | Inventive homo polymerizations of propylene | | | | | | | | | |
|---|---|---|---|---|---|---|---|---|---|---|
| example | Activity, g-pp/g-cat | MFR, g/10 min | Xylene soluble, % | Flex Mod, MPa | Mn, g/mole | Mw, g/mole | Mz, g/mole | Mw/Mn | Mz/Mw | Mz/Mn |
| 1 | 24,900 | 150 | 1.1 | 1,910 | 19,869 | 178,281 | 1,830,807 | 9.0 | 10.3 | 92.1 |
| 2 | 17,200 | 130 | 1.0 | 1,930 | 22,668 | 205,371 | 2,515,820 | 9.1 | 12.3 | 111.0 |
| 3 | 16,100 | 160 | 0.9 | 1,920 | 20,361 | 205,377 | 2,623,564 | 10.1 | 12.8 | 128.9 |
| 4 | 20,500 | 150 | 1.1 | 1,930 | 17,036 | 145,993 | 1,255,413 | 8.6 | 8.6 | 73.7 |
| 5 | 23,700 | 88 | 0.7 | 1,940 | 25,084 | 237,064 | 2,968,164 | 9.5 | 12.5 | 118.3 |

TABLE 1-continued

Inventive homo polymerizations of propylene

| example | Activity, g-pp/g-cat | MFR, g/10 min | Xylene soluble, % | Flex Mod, MPa | Mn, g/mole | Mw, g/mole | Mz, g/mole | Mw/Mn | Mz/Mw | Mz/Mn |
|---|---|---|---|---|---|---|---|---|---|---|
| 6 | 28,100 | 33 | 0.7 | 1,930 | 22,369 | 297,974 | 3,070,934 | 13.3 | 10.3 | 137.3 |
| 7 | 19,400 | 260 | 1 | 2,020 | 14,793 | 178,210 | 2,436,394 | 12.0 | 13.7 | 164.7 |
| (8) | | | | 2,470 (w/nucleator) | | | | | | |

TABLE 2

Comparative homo polymerizations of propylene

| example | Activity, g-pp/g-cat | MFR, g/10 min | Xylene soluble, % | Flex Mod, MPa | Mn, g/mole | Mw, g/mole | Mz, g/mole | Mw/Mn | Mz/Mw | Mz/Mn |
|---|---|---|---|---|---|---|---|---|---|---|
| Comp. 1 | 18,500 | 170 | 1.0 | 1,880 | 22,143 | 193,724 | 1,765,352 | 8.7 | 9.1 | 79.7 |
| Comp. 2 | 14,800 | 31 | 1.2 | 1,840 | 20,673 | 374,306 | 4,085,509 | 18.1 | 10.9 | 197.6 |
| Comp. 3 | 15,300 | 180 | 1.1 | 1,900 | 23,231 | 168,634 | 1,899,428 | 7.3 | 11.3 | 81.8 |
| Comp. 4 | 39,000 | 110 | 1.2 | 1,830 | 21,414 | 193,465 | 2,201,669 | 9.0 | 11.4 | 102.8 |

TABLE 3

ICP production

| | Activity | | | | Ethylene content | | | | |
|---|---|---|---|---|---|---|---|---|---|
| example | Bulk-Homo g/g-cat | Gas-ICP g/g-cat | MFR g/10 min | EPR wt % | in EPR % | in XI % | IV-EPR dL/g | Flex Mod, MPa | Izod (23° C.) kJ/m² |
| 9 | 35,300 (15 min) | 1,500 | 170 (Homo) 120 (ICP) | 5 | 42.5 | 1.1 | 5.5 | 1,660 | 4.4 |
| Comp. 5 | 43,900 (15 min) | 3,000 | 180 (Homo) 110 (ICP) | 5.6 | 40.3 | 1.6 | 5.6 | 1,600 | 4.5 |

As used herein, "consisting essentially of" means that the claimed ICP includes only the named components and no additional components that will alter its measured properties by any more than 10 or 20%; and most preferably means that additional components or "additives" are present to a level of less than 5, or 4, or 3, or 2 wt % by weight of the composition. Such additives can include, for example, fillers, colorants, antioxidants, alkyl-radical scavengers, anti-UV additives, acid scavengers, slip agents, curatives and cross-linking agents, aliphatic and/or cyclic containing oligomers or polymers (sometimes referred to as "hydrocarbon resins"), and other additives well known in the art.

As it relates to a process, the phrase "consisting essentially of" means that there are no other process features that will alter the claimed properties of the polymer, polymer blend or article produced therefrom by any more than 10 or 20%.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:
1. An impact copolymer comprising:
a homopolypropylene having a melt flow rate of at least 20 g/10 min (ASTM D1238, 230° C., 2.16 kg), an Mw/Mn within a range from 7 to 16, and an Mz/Mw within a range from 7 to 16, and comprising 1.1 wt % or less of atactic polypropylene based on a total weight of the homopolypropylene and the atactic polypropylene; and
within a range from 2 wt % to 30 wt % of a propylene-α-olefin copolymer, by weight of the impact copolymer;
wherein the impact copolymer has a melt flow rate within a range of 60 g/10 min to 160 g/10 min (ASTM D1238, 230° C., 2.16 kg); and
wherein the propylene-α-olefin copolymer is prepared by a gas phase polymerization reaction in the presence of the homopolypropylene, such that at least some of the homopolypropylene and the propylene-α-olefin copolymer are linked to one another, and the propylene-α-olefin copolymer is embedded in a continuous matrix of the homopolypropylene wherein the propylene-α-olefin copolymer comprises within a range from 30 wt % to 43 wt % α-olefin derived units by weight of the propylene-α-olefin copolymer.

2. The impact copolymer of claim 1, wherein the propylene-α-olefin copolymer has an intrinsic viscosity within a range from 4 to 8 dL/g.

3. The impact copolymer of claim 1, wherein the propylene-α-olefin copolymer comprises α-olefin derived units that are selected from the group consisting of ethylene, C4 to C8 α-olefin derived units, and combinations thereof.

4. The impact copolymer of claim 1, wherein a crystalline portion of the propylene-α-olefin copolymer is 3 wt % or less relative to a total amount of propylene-α-olefin copolymer.

5. The impact copolymer of claim 1, wherein the impact copolymer has a flexural modulus of at least 1500 MPa.

6. The impact copolymer of claim 1, wherein the impact copolymer has an Izod impact strength (23° C.) of at least 4 kJ/m$^2$.

7. The impact copolymer of claim 1, wherein the impact copolymer is obtained by combining a Ziegler-Natta catalyst with propylene in two slurry polymerization reactors in series to produce the homopolypropylene, followed by combining the homopolypropylene and the Ziegler-Natta catalyst with propylene and an α-olefin in a gas phase reactor.

8. The impact copolymer of claim 7, wherein the Ziegler-Natta catalyst has at least two different internal electron donors.

9. The impact copolymer of claim 7, wherein the Ziegler-Natta catalyst comprises a dialkyl- and/or dialkoxymagnesium support having an average particle size within a range from 5 μm to 120 μm.

10. An impact copolymer with a MFR within a range from 60 g/10 min to 140 g/10 min (230° C., 2.16 kg) consisting essentially of a homopolypropylene and within a range from 4 wt % to 10 wt % of an ethylene-propylene copolymer (EPR) by weight of the impact copolymer; wherein the homopolypropylene has a MFR within a range from 80 g/10 min to 200 g/10 min (230° C., 2.16 kg), an Mw/Mn within a range from 8 to 15, an Mz/Mw within a range from 7 to 16, and comprising 1.1 wt % or less atactic polypropylene based on the total weight of the homopolypropylene and atactic polypropylene; and the EPR has within a range from 30 wt % to 50 wt % ethylene derived units by weight of the EPR, and an intrinsic viscosity within a range from 4 to 7 dL/g; and the impact copolymer is obtained by combining a Ziegler-Natta catalyst with propylene in two slurry polymerization reactors in series to produce the homopolypropylene, followed by combining the homopolypropylene and Ziegler-Natta catalyst with propylene and ethylene in a gas phase reactor to produce the EPR that is linked to the homopolypropylene, where the Ziegler-Natta catalyst comprises to different internal electron donors wherein the propylene-α-olefin copolymer comprises within a range from 30 wt % to 43 wt % α-olefin derived units by weight of the propylene-α-olefin copolymer.

11. The impact copolymer of claim 1, wherein the homopolypropylene comprises at least a first homopolypropylene and a second homopolypropylene that have melt flow rate values differing by at least 50 g/10 min (ASTM D1238, 230° C., 2.16 kg).

12. The impact copolymer of claim 11, wherein the first homopolypropylene has a melt flow rate of 5 g/10 min or less (ASTM D1238, 230° C., 2.16 kg) and the second homopolypropylene has a melt flow rate of 100 g/10 min or more (ASTM D1238, 230° C., 2.16 kg).

13. The impact copolymer of claim 12, wherein the melt flow rate of the second homopolypropylene is within a range of 100 g/10 min to 1000 g/10 min (ASTM D1238, 230° C., 2.16 kg).

14. The impact copolymer of claim 1, wherein the melt flow rate of the homopolypropylene is within a range of 80 g/10 min to 160 g/10 min (ASTM D1238, 230° C., 2.16 kg).

15. The impact copolymer of claim 1, wherein the impact copolymer consists essentially of the homopolypropylene and the propylene-α-olefin copolymer.

16. The impact copolymer of claim 1, wherein the impact copolymer comprises within a range from 2 wt % to 20 wt % of the propylene-α-olefin copolymer, by weight of the impact copolymer.

17. The impact copolymer of claim 1, wherein the impact copolymer consists of the homopolypropylene and the propylene-α-olefin copolymer.

18. The impact copolymer of claim 17, wherein the impact copolymer has a flexural modulus of at least 1500 MPa without a nucleating agent.

* * * * *